(12) United States Patent
Dame

(10) Patent No.: US 10,462,783 B2
(45) Date of Patent: Oct. 29, 2019

(54) SYSTEM AND METHOD FOR HIGHLY DETERMINISTIC MEDIA ACCESS CONTROL

(71) Applicant: THE BOEING COMPANY, Chicago, IL (US)

(72) Inventor: Stephen Dame, Everett, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 15/055,107

(22) Filed: Feb. 26, 2016

(65) Prior Publication Data

US 2017/0251467 A1    Aug. 31, 2017

(51) Int. Cl.
| H04W 72/04 | (2009.01) |
| H04L 5/00 | (2006.01) |
| H04W 4/38 | (2018.01) |
| H04L 29/12 | (2006.01) |
| H04W 24/08 | (2009.01) |

(Continued)

(52) U.S. Cl.
CPC ....... *H04W 72/0446* (2013.01); *H04L 5/0005* (2013.01); *H04L 5/0028* (2013.01); *H04L 5/0064* (2013.01); *H04L 5/0092* (2013.01); *H04L 61/6022* (2013.01); *H04W 4/38* (2018.02); *H04W 24/08* (2013.01); *H04W 72/0453* (2013.01); *H04W 72/06* (2013.01); *H04W 72/1247* (2013.01); *H04W 74/0808* (2013.01); *H04W 74/0858* (2013.01); *H04L 5/0032* (2013.01); *H04L 5/0046* (2013.01); *H04L 5/0085* (2013.01); *H04L 5/0087* (2013.01); *H04L 5/0089* (2013.01)

(58) Field of Classification Search
CPC .......................... H04W 72/0446; H04W 4/006
See application file for complete search history.

(56) References Cited

U.S. PATENT DOCUMENTS

| 5,719,868 A | 2/1998 | Young |
| 6,504,829 B1 | 1/2003 | Young et al. |

(Continued)

FOREIGN PATENT DOCUMENTS

| EP | 0 713 347 A2 | 5/1996 |
| EP | 0 841 763 A1 | 5/1998 |
| EP | 3211817 A1 | 8/2017 |

OTHER PUBLICATIONS

European Patent Office Extended European Search Report, Application No. 16207563.4-1875, dated May 10, 2017.

(Continued)

*Primary Examiner* — Jeffrey M Rutkowski
*Assistant Examiner* — Chae S Lee
(74) *Attorney, Agent, or Firm* — Toler Law Group, PC

(57) ABSTRACT

A system and method for providing media access control for networked nodes over a plurality of channels. Each channel is divided into a number of time slots per frame of data organized in a channel allocation schedule. The number of time slots is selected for each channel and is greater than or equal to one per second. Each time slot has a slot transfer rate equal to or less than the maximum channel transfer rate. A server receives a request for channel resources that includes a bandwidth requirement. At least one time slot in a channel corresponding to the bandwidth requirement over a frame time is identified and sent to the requesting node.

20 Claims, 19 Drawing Sheets

(51) Int. Cl.
*H04W 72/06* (2009.01)
*H04W 72/12* (2009.01)
*H04W 74/08* (2009.01)

(56) References Cited

U.S. PATENT DOCUMENTS

| | | | | |
|---|---|---|---|---|
| 2008/0279155 | A1* | 11/2008 | Pratt, Jr. | H04L 12/66 370/336 |
| 2009/0310571 | A1* | 12/2009 | Matischek | H04W 72/0406 370/336 |
| 2010/0075704 | A1* | 3/2010 | McHenry | H04W 16/14 455/509 |
| 2011/0038343 | A1* | 2/2011 | Bhatti | H04W 28/06 370/330 |
| 2012/0188901 | A1 | 7/2012 | Struhsaker et al. | |
| 2013/0070734 | A1 | 3/2013 | Hwang et al. | |
| 2013/0128872 | A1* | 5/2013 | Sinsuan | H04W 28/06 370/336 |
| 2014/0247817 | A1 | 9/2014 | Lim et al. | |
| 2014/0341158 | A1 | 11/2014 | Farricker | |

OTHER PUBLICATIONS

IEEE Standard for Local and metropolitan area networks—Part 15.4: Low-Rate Wireless Personal Area Networks (LR-WPANs), IEEE, Piscataway, NJ, USA, Sep. 5, 2011,152 pages.
IEEE Standard 802.15.4-2011—Low-Rate Wireless Personal Area Networks (LR-WPANs), IEEE, Piscataway, NJ, USA, Sep. 5, 2011,152 pages.
Akyildiz, I. F., & Xudong Wang. (2005). A survey on wireless mesh networks. Communications Magazine, IEEE, 43(9), S23-S30.
Burda, R., & Wietfeld, C. (2007). A distributed and autonomous beacon scheduling algorithm for IEEE 802.15.4/ZigBee networks. Paper presented at the Mobile Ad Hoc and Sensor Systems, 2007. MASS 2007. IEEE International Conference on, 1-6.
Gupta, P., & Kumar, P. R. (2000). The capacity of wireless networks. Information Theory, IEEE Transactions on, 46(2), 388-404.
IEEE Standard for Information Technology—Telecommunications and Information Exchange Between Systems—Local and Metropolitan Area Networks—Specific Requirements Part 15.4: Wireless Medium Access Control (MAC) and Physical Layer (PHY) Specifications for Low-Rate Wireless Personal Area Networks (WPANs), IEEE Std 802.15.4-2006 (Revision of IEEE Std 802.15.4-2003), vol., no., pp. 0_1-305, 2006.
ISO/IEC 7498-1:1994, Information technology—Open Systems Interconnection—Basic Reference Model: The Basic Model, ITU-T Recommendation X.200.
M. Weiser, "The Computer for the 21st Century," Scientific American, (1991), pp. 94-104; Reprinted in IEEE Pervasive Computing (2002), vol. 1, pp. 19-25.
Windsor, J., & Hjortnaes, K. (2009). Time and space partitioning in spacecraft avionics. Paper presented at the Space Mission Challenges for Information Technology, 2009. SMC-IT 2009. Third IEEE International Conference on, 13-20.
ZigBee Specification, Document 053474r17, Zigbee Standards Organization, 2007.

* cited by examiner

FIG. 2B

| CH | | Frame T_f=10 s. | | | | | | | | | | | | | | | | | | | S |
|---|---|---|---|---|---|---|---|---|---|---|---|---|---|---|---|---|---|---|---|---|---|
| 0 | ... | 25 | 25 | 25 | 25 | 25 | 25 | 25 | 25 | 25 | 25 | 25 | 25 | 25 | 25 | 25 | 25 | 25 | 25 | 25 | 25 | 10 |
| 1 | ... | 50 | | 50 | | 50 | | 50 | | 50 | | 50 | | 50 | | 50 | | 50 | | 50 | | 5 |
| 2 | ... | 125 | | | | 125 | | | | 125 | | | | 125 | | | | | | | | 2 |
| 3 | ... | 25 | 25 | 25 | 25 | 25 | 25 | 25 | 25 | 25 | 25 | 25 | 25 | 25 | 25 | 25 | 25 | 25 | 25 | 25 | 25 | 10 |
| 4 | ... | 50 | | 50 | | 50 | | 50 | | 50 | | 50 | | 50 | | 50 | | 50 | | 50 | | 5 |
| 5 | ... | 125 | | | | 125 | | | | 125 | | | | 125 | | | | | | | | 2 |
| 6 | ... | 25 | 25 | 25 | 25 | 25 | 25 | 25 | 25 | 25 | 25 | 25 | 25 | 25 | 25 | 25 | 25 | 25 | 25 | 25 | 25 | 10 |
| 7 | ... | 250 | | | | | | | | 250 | | | | | | | | | | | | 1 |
| 8 | ... | 25 | 25 | 25 | 25 | 25 | 25 | 25 | 25 | 25 | 25 | 25 | 25 | 25 | 25 | 25 | 25 | 25 | 25 | 25 | 25 | 10 |
| 9 | ... | 50 | | 50 | | 50 | | 50 | | 50 | | 50 | | 50 | | 50 | | 50 | | 50 | | 5 |
| 10 | ... | 125 | | | | 125 | | | | 125 | | | | 125 | | | | | | | | 2 |
| 11 | ... | 25 | 25 | 25 | 25 | 25 | 25 | 25 | 25 | 25 | 25 | 25 | 25 | 25 | 25 | 25 | 25 | 25 | 25 | 25 | 25 | 10 |
| 12 | ... | 50 | | 50 | | 50 | | 50 | | 50 | | 50 | | 50 | | 50 | | 50 | | 50 | | 5 |
| 13 | ... | 125 | | | | 125 | | | | 125 | | | | 125 | | | | | | | | 2 |
| 14 | ... | 25 | 25 | 25 | 25 | 25 | 25 | 25 | 25 | 25 | 25 | 25 | 25 | 25 | 25 | 25 | 25 | 25 | 25 | 25 | 25 | 10 |
| 15 | ... | 250 | | | | | | | | 250 | | | | | | | | | | | | 1 | t=1 Sec.

*FIG. 5A*

| Radio | CH | Frame T_f=10 s. | S |
|---|---|---|---|
| 1 | 0 | 25 25 25 25 25 25 25 25 25 25 25 25 25 25 25 25 | 10 |
| 2 | 1 | 50 50 50 50 50 50 50 50 50 50 | 5 |
| 3 | 2 | N1 125 N1 125 | 2 |
| 4 | 3 | 25 25 25 25 25 25 25 25 N2 25 25 25 25 25 25 25 25 N2 | 10 |
| 5 | 4 | 50 50 50 50 N3 50 50 50 50 N3 | 5 |
| 6 | 5 | 125 N4 125 N4 | 2 |
| 7 | 6 | 25 25 25 25 25 25 25 25 25 25 25 25 25 25 25 25 | 10 |
| 8 | 7 | 250 250 | 1 |
| 9 | 8 | 25 25 25 25 25 25 25 25 25 25 25 25 25 25 25 25 | 10 |
| 10 | 9 | 50 50 50 50 50 50 50 50 50 50 | 5 |
| 11 | 10 | 125 125 125 125 | 2 |
| 12 | 11 | 25 25 25 25 25 25 25 25 25 25 25 25 25 25 25 25 | 10 |
| 13 | 12 | 50 50 50 50 50 50 50 50 50 50 | 5 |
| 14 | 13 | 125 125 125 125 | 2 |
| 15 | 14 | 25 25 25 25 25 25 25 25 25 25 25 25 25 25 25 25 | 10 |
| 16 | 15 | 250 250 | 1 |

| Radio | CH | Frame T$_f$=10 s. | | | | | | | | | | | | | | | | | | | S |
|---|---|---|---|---|---|---|---|---|---|---|---|---|---|---|---|---|---|---|---|---|---|
| 1 | 0 | ... | 25 | 25 | 25 | 25 | 25 | 25 | 25 | 25 | 25 | 25 | 25 | 25 | 25 | 25 | 25 | 25 | 25 | 25 | 10 |
| 2 | 1 | ... | 50 | | 50 | | 50 | | 50 | | 50 | 50 | | 50 | | 50 | | 50 | | 50 | | 5 |
| 3 | 2 | ... | N1 | | | | N5 | | | | N1 | | | | N5 | | | | | | | 2 |
| 4 | 3 | ... | 25 | 25 | 25 | 25 | 25 | 25 | 25 | 25 | 25 | N2 | 25 | 25 | 25 | 25 | 25 | 25 | 25 | 25 | N2 | 10 |
| 5 | 4 | ... | 50 | | 50 | | 50 | | 50 | | N3 | 50 | | 50 | | 50 | | 50 | | N3 | | 5 |
| 6 | 5 | ... | 125 | | | | N4 | | | | 125 | | | | N4 | | | | | | | 2 |
| 7 | 6 | ... | 25 | 25 | 25 | 25 | 25 | 25 | 25 | 25 | 25 | N7 | 25 | 25 | 25 | 25 | 25 | 25 | 25 | N7 | 25 | 10 |
| 8 | 7 | ... | 250 | | | | | | | | 250 | | | | | | | | | | | 1 |
| 9 | 8 | ... | 25 | 25 | 25 | 25 | N8 | 25 | 25 | 25 | 25 | 25 | 25 | 25 | 25 | N8 | 25 | 25 | 25 | 25 | 25 | 10 |
| 10 | 9 | ... | 50 | | 50 | | 50 | | N6 | | 50 | 50 | | 50 | | 50 | | N6 | | 50 | | 5 |
| 11 | 10 | ... | 125 | | | | 125 | | | | 125 | | | | 125 | | | | | | | 2 |
| 12 | 11 | ... | 25 | 25 | 25 | 25 | 25 | 25 | 25 | 25 | 25 | 25 | 25 | 25 | 25 | 25 | 25 | 25 | 25 | 25 | 25 | 10 |
| 13 | 12 | ... | 50 | | 50 | | 50 | | 50 | | 50 | 50 | | 50 | | 50 | | 50 | | 50 | | 5 |
| 14 | 13 | ... | 125 | | | | 125 | | | | 125 | | | | 125 | | | | | | | 2 |
| 15 | 14 | ... | 25 | 25 | 25 | 25 | 25 | 25 | 25 | 25 | 25 | 25 | 25 | 25 | 25 | 25 | 25 | 25 | 25 | 25 | 25 | 10 |
| 16 | 15 | ... | 250 | | | | | | | | 250 | | | | | | | | | | | 1 |

*FIG. 6E*

| Radio | CH | Frame T$_r$=10 s. | | | | | | | | | | | | | | | | | | | S |
|---|---|---|---|---|---|---|---|---|---|---|---|---|---|---|---|---|---|---|---|---|---|
| 1 | 0 | ... | 25 | 25 | 25 | 25 | 25 | 25 | 25 | 25 | 25 | 25 | 25 | 25 | 25 | 25 | 25 | 25 | 25 | 25 | 10 |
| 2 | 1 | ... | 50 | | 50 | | 50 | | 50 | | 50 | 50 | | 50 | | 50 | | 50 | | 50 | 5 |
| 3 | 2 | ... | N10 | | | | N5 | | | | N10 | | | | | N5 | | | | | 2 |
| 4 | 3 | ... | 25 | 25 | 25 | 25 | 25 | 25 | 25 | N8 | N2 | 25 | 25 | 25 | 25 | 25 | 25 | 25 | N8 | N2 | 10 |
| 5 | 4 | ... | 50 | | 50 | | 50 | | N6 | | N9 | 50 | | 50 | | 50 | | N6 | | N9 | 5 |
| 6 | 5 | ... | 125 | | | | | | N4 | | | 125 | | | | | | N4 | | | 2 |
| 7 | 6 | ... | 25 | 25 | 25 | 25 | 25 | 25 | 25 | N7 | 25 | 25 | 25 | 25 | 25 | 25 | 25 | 25 | N7 | 25 | 10 |
| 8 | 7 | ... | 250 | | | | | | | | | 250 | | | | | | | | | 1 |
| 9 | 8 | ... | 25 | 25 | 25 | 25 | 25 | 25 | 25 | 25 | 25 | 25 | 25 | 25 | 25 | 25 | 25 | 25 | 25 | 25 | 10 |
| 10 | 9 | ... | 50 | | 50 | | 50 | | 50 | | 50 | 50 | | 50 | | 50 | | 50 | | 50 | 5 |
| 11 | 10 | ... | 125 | | | | | 125 | | | | 125 | | | | | 125 | | | | 2 |
| 12 | 11 | ... | 25 | 25 | 25 | 25 | 25 | 25 | 25 | 25 | 25 | 25 | 25 | 25 | 25 | 25 | 25 | 25 | 25 | 25 | 10 |
| 13 | 12 | ... | 50 | | 50 | | 50 | | 50 | | 50 | 50 | | 50 | | 50 | | 50 | | 50 | 5 |
| 14 | 13 | ... | 125 | | | | | 125 | | | | 125 | | | | | 125 | | | | 2 |
| 15 | 14 | ... | 25 | 25 | 25 | 25 | 25 | 25 | 25 | 25 | 25 | 25 | 25 | 25 | 25 | 25 | 25 | 25 | 25 | 25 | 10 |
| 16 | 15 | ... | 250 | | | | | | | | | 250 | | | | | | | | | 1 |

FIG. 6G

SYSTEM AND METHOD FOR HIGHLY DETERMINISTIC MEDIA ACCESS CONTROL

TECHNICAL FIELD

The present invention relates generally to ad hoc node networks and, more particularly to, highly deterministic media access control in a node network.

BACKGROUND

Wireless Sensor Networks (WSNs) are becoming an integral part of ubiquitous computing, a growing trend involving embedding processors in all types of objects and allowing them to communicate usually on an ad hoc basis. In general, a large number of wireless sensors collect and transmit information about the environment to an application that uses the information. The wireless sensors are placed in the environment and connect to a data network to communicate the data they sense as wireless sensor nodes. The data is transmitted to applications that use the data. Such applications may be anywhere geographically and readily accessible over the Internet.

Wireless sensors nodes may have a temperature sensor, a microphone, a pressure sensor, an optical sensor, a camera, an accelerometer, or any other suitable sensor on the device. Wireless sensor nodes may be distributed in an environment in large numbers and communicate as a wireless sensor network. A wireless sensor network may also connect to other types of network nodes lacking sensors, but providing functions useful to the application or to the environment, or for supporting data communications in the network.

Wireless sensor networks ("WSN") may provide data to a wide variety of applications and environments using a large and dynamic number of sensor nodes. For example, wireless devices are being deployed in aviation application environments. Low power heterogeneous sensors numbering in the hundreds or thousands are wirelessly networked to form a predominantly asymmetrical flow of data from sensors to data sinks. The data sinks may be servers, or other computing resources, that integrate the sensor data into higher intelligence about the environment being sensed. Ad hoc protocols based on IEEE 802.15.4, such as Zigbee, for example, have been developed in the past decade to partially address the deployment of WSNs. However, there are shortcomings that can be attributed to the non-determinism and overhead associated with such dynamic ad hoc wireless environments. Aviation applications, for example, demand a higher level of network availability, deterministic timing, and predictable data packet throughput in order to reach required levels of application reliability on the order of $10^{-5}$ failures per flight hour.

The typical ad-hoc, event driven mode in which wireless sensor nodes attempt to communicate data with no predetermined message timing incorporates Carrier Sense Multiple Access (CSMA) schemes. Networks utilizing CSMA schemes may use collision avoidance or collision detection to minimize the number of failed transmissions in the communication medium. However, as the number of network nodes increases, and as the network nodes use more and more of available bandwidth, the number of collisions increases resulting in reduced network availability and increased latency. The required levels of reliability become more difficult to maintain.

As such, there is a need for a system and method for controlling access to a communication medium that maintains high availability and reliability as the number of nodes in the network continues to grow.

SUMMARY

In view of the above, examples of methods and systems for controlling access to a communication medium are provided. In one example, a method is provided for controlling access to the communication medium for a plurality of network nodes. The plurality of network nodes are configured to communicate on a plurality of channels on corresponding frequency bands, each channel having a maximum channel transfer rate. According to the method, a channel allocation schedule is generated such that each channel is divided into a channel-assigned number of time slots per frame of data defined by a frame time. Each time slot has a slot transfer rate equal to or less than the maximum channel transfer rate. A request for channel resources is received from a network node in the plurality of network nodes. The request includes a bandwidth requirement. At least one time slot is identified in the frame of a selected channel on the channel allocation schedule. The identified at least one time slot provides a throughput corresponding to the bandwidth requirement in the request for channel resources. A channel resource allocation message is sent to the network node identifying the selected channel and the at least one time slot in the frame of the selected channel as allocated to the network node.

In another illustrative example, a server is provided with a highly deterministic media access controller. The server includes a network interface configured to communicate on a communication medium with a plurality of network nodes on a plurality of channels at corresponding frequency bands, each channel having a maximum channel transfer rate. The media access controller allocates resources to the plurality of network nodes on the plurality of channels using a processor and a non-transitory computer-readable medium. The computer-readable medium stores executable instructions that, when executed by the processor, are operative to:

generate a channel allocation schedule where each channel is divided into a number of time slots per frame of data defined by a frame time, where the number of time slots is selected for each channel and is greater than or equal to one, each time slot having a slot transfer rate equal to or less than the maximum channel transfer rate;

receive a request for channel resources from a network node of the plurality of network nodes, the request comprising a bandwidth requirement;

identify at least one time slot in the frame of a selected channel, the at least one time slot providing a throughput corresponding to the bandwidth requirement in the request for channel resources; and send a channel resource allocation message to the network node identifying the selected channel and the at least one time slot in the frame of the selected channel as allocated to the network node.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 2B is an example of a channel allocation schedule for allocating time slots in a plurality of channels for communicating over a communication medium.

FIG. 5A is an example of a channel allocation schedule having a frame with a frame time of 10 seconds.

FIG. 6B is a channel allocation schedule illustrating the allocation of channel resources for the network nodes in the wireless sensor network in FIG. 6A.

FIGS. 6D and 6E are examples of the channel allocation schedule of the wireless sensor network in FIG. 6C illustrating allocation of resources subsequent to secondary and tertiary failover.

FIG. 6G is the channel allocation schedule illustrating allocation of resources subsequent to a de-allocation of resources for the lowest priority network nodes and allocation to higher priority network nodes.

DETAILED DESCRIPTION

Figure 1:
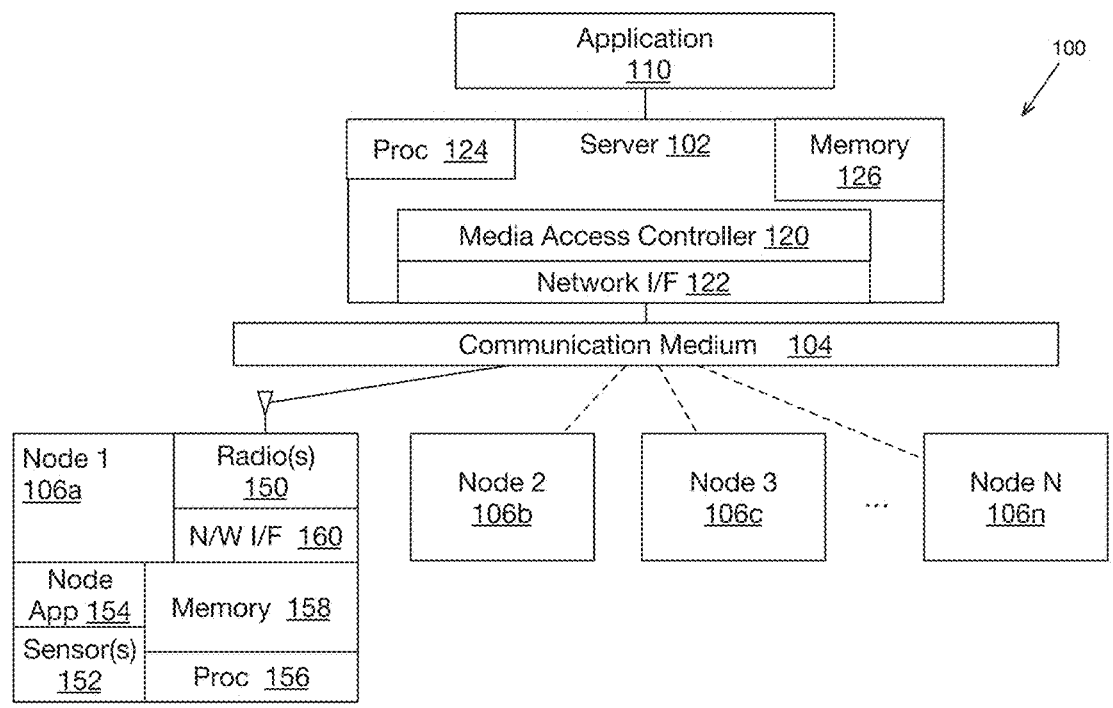
FIG. 1 is a block diagram of an example of a wireless node network.

FIG. 1 is a block diagram of an example of a wireless node network 100. The wireless node network 100 includes a server 102, a communication medium 104, and a plurality of network nodes 106a-n. The network nodes 106a-n communicate on the communication medium 104 with the server 102. An application 110 may connect to the server 102 using known network protocols to send or receive data to or from the network nodes 106a-n. The communication medium 104 in the implementations described herein is a wireless medium. However, those of ordinary skill in the art will readily appreciate that examples of the invention may be practiced over a wired medium as well.

The application 110 may be any system or function of a system that makes advantageous use of data communicated from the network nodes 106a-n. In general, the plurality of network nodes 106a-n in the wireless node network 100 may include any device configured to communicate over the communication medium 104 for whatever purpose or function. In the examples described herein, the plurality of network nodes 106a-n shall be understood to be network nodes having data to communication through the communication medium 104 to the application 110. One type of network node that may be used for the plurality of network nodes 106a-n is a sensor node as described in more detail below with reference to Node 1 106a.

The application 110 may use the data from the network nodes 106a-n to provide meaning in any suitable environment and to interact with the user. Examples of the application 110 may operate using the Hyper-Text Transfer Protocol (HTTP), the File Transfer Protocol (FTP), or other suitable protocols to access data communicated over a network (such as the Internet, for example). The functions performed by the application 110 may include any function relevant to the environment in which the network nodes 106a-n are deployed. For example, the application 110 may be a navigation system that receives data from network nodes 106a-n implemented as sensor nodes distributed throughout the relevant environment, which would include the vehicle, other vehicles, roads, road signs, etc. Such an application 110 may operate in a vehicle, or in a cloud service, or on any other suitable platform. Reference is made to a single application 110, however, it is to be understood that other applications may also connect to the server 102 and thus obtain access to the data retrieved from at least some of the network nodes 106a-n. It is also to be understood that while FIG. 1 shows a simple connection between the server 102 and the application 110, many other network components or entire systems may operate within or between the server 102 and the application 110. For example, the application 110 might communicate with a web service, running within the server 102, which serves HTML formatted data to the application 110 after processing raw sensor data received from network nodes 106a-n over the wireless node network 100.

As noted above, the application 110 and, accordingly, the wireless node network 100 are not limited to any specific environment, function, network, or system. Certain environments would find particularly advantageous use of example implementations of the wireless node network 100 described with reference to FIG. 1. Such environments include systems with applications having mission-critical functions that rely on a high level of network availability, deterministic timing and predictable data packet throughput. Avionics applications operate in such an environment. While example implementations are not limited by any specific application or environment, the description below shall refer to avionics applications where such a specific example would help in clarifying the description.

The server 102 may be implemented as any network component that provides the basic functions of a typical known server. The server 102 shown in FIG. 1 includes a media access controller 120, a network interface 122, a processor 124, and memory 126 or suitable data storage system. The network interface 122 includes hardware and software functions for communicating on the communications medium 104. In the context of the Open Systems Interconnect (OSI) model, the network interface 122 may provide OSI Layer 1 operation. In examples described below, the network interface 122 enables wireless communication over the communication medium 104, and as such would include a wireless communications device, such as a radio. In some implementations, the network interface 122 may include multiple radios to increase throughput, or to provide redundancy.

The communication medium 104 in the description below is over the air radio communication. The server 102 and the plurality of network nodes 106a-n may implement standard protocols incorporating features described herein. For purposes of providing clarity in the description below, it is assumed that communication over the communication medium 104 shall proceed according to the IEEE 802.15.4 protocol except as the protocol is to be modified in accordance with the media access control methods described herein unless stated otherwise. Nevertheless, it is to be understood that example implementations may operate using any multichannel communication scheme in which channels are defined by frequency bands at corresponding frequencies where each channel has a defined maximum transfer rate. The communication medium 104 is shared and accessed using a suitable carrier sense multiple access (CSMA) scheme.

The processor 124 and memory 126 may be implemented using any suitable processing sub-system and storage system. The processor 124 may be any computer, microprocessor, field-programmable gate array (FPGA), or processing component programmed to function as a server. The memory 126 is any suitable a non-transitory computer-readable medium equipped to store executable instructions for operating the server 102. The executable instructions stored in the memory 126 include instructions for performing the functions of the server 102, which includes any functions incorporated in the media access controller 120.

The media access controller 120 performs, in the context of the OSI model, Layer 2 functions, which include the functions used in providing access to the communication medium 104. The media access controller 120 operates by generating a channel allocation schedule, which is described in more detail below with reference to FIGS. 2A and 2B.

In an example implementation, the plurality of network nodes 106a-106n includes sensor nodes such as Node 1 106a. Node 1 106a has one or more radios 150, one or more sensors 152, a node application 154, a processor 156, memory 158, and a network interface 160. The node processor 156 and node memory 158 may be any suitable processor and memory, or storage system. The network interface 160 controls communication of data by the radio(s) 150 on the communication medium 104. Data is received from the node application 154 and stored in a data structure formatted for communication according to a communication protocol. For example, the data may be organized in the payload of packets according to a suitable protocol. The network interface 160 detects a time slot in a frame of a channel that has been assigned to Node 1 106a as described below with reference to FIG. 2A. The channels are shared by the plurality of network nodes 106a-n, which are communicating data over the communication medium 104 on an ad hoc basis raising the possibility that its data transmission may collide with that of another node. The network interface 160 may employ any suitable CSMA technique for ensuring successful data transmission.

The one or more sensors 152 may include any device that senses environmental characteristics. Examples of sensors 152 that may be implemented on a sensor node include temperature sensors, pressure sensors, sound sensors, optical sensors, and any other suitable transducer. The sensors 152 convert the environmental characteristic sensed into an electrical signal, which may be processed by an analog to digital converter. The signal may be further processed as required for specific applications before being communicated to the server 102 by the node application 154. The node application 154 may include software functions executed by the processor 156 for processing the raw sensor data.

The radio or radios 150 are configured to communicate with the radio or radios on the server 102, or in some examples, with the radio or radios on other network nodes. The radios 150 are tuned to the frequency band corresponding to the channel that Node 1 106a has been allocated and transmits or receives radio signals in the time slot or time slots allocated to Node 1 106a as described below with reference to FIGS. 2A-2C.

Figure 2A:
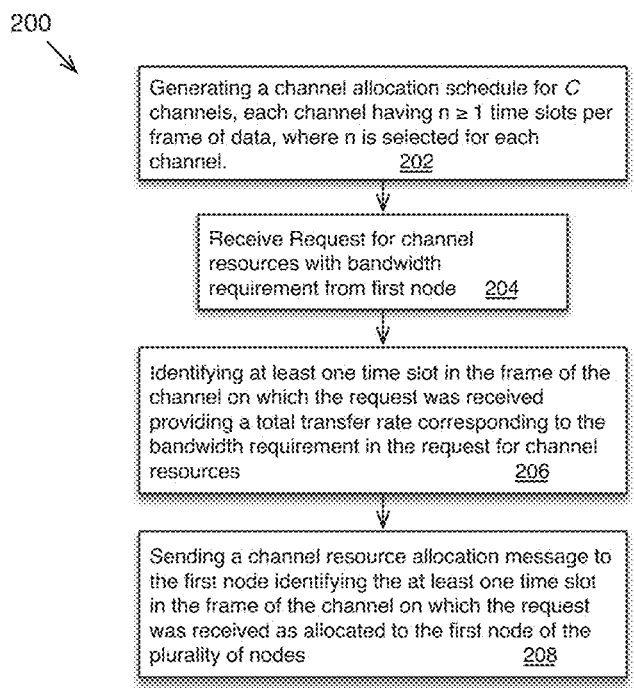
FIG. 2A is a flowchart for an example of a method for allocating media access to network nodes.

FIG. 2A is a flowchart for an example of a method 200 for allocating media access to network nodes. In the example described with reference to FIG. 2A, the method 200 is performed by the server 102 (FIG. 1), and more particularly, by the media access controller 120. When the server 102 is first deployed and initialized, network nodes 106 (FIG. 1) randomly send requests to the server 102 for channel resource allocation. Prior to granting any resources, the media access controller 120 (FIG. 1) generates a channel allocation schedule at step 202 of method 200. The media access controller 120 begins with a number of unallocated channels corresponding to assigned frequency bands, each frequency band having a maximum data transfer rate. A frame time is defined for all the channels to communicate a frame of data. The channels are divided into time slots where each channel is divided into a number of time slots per frame of data.

Figure 2B:
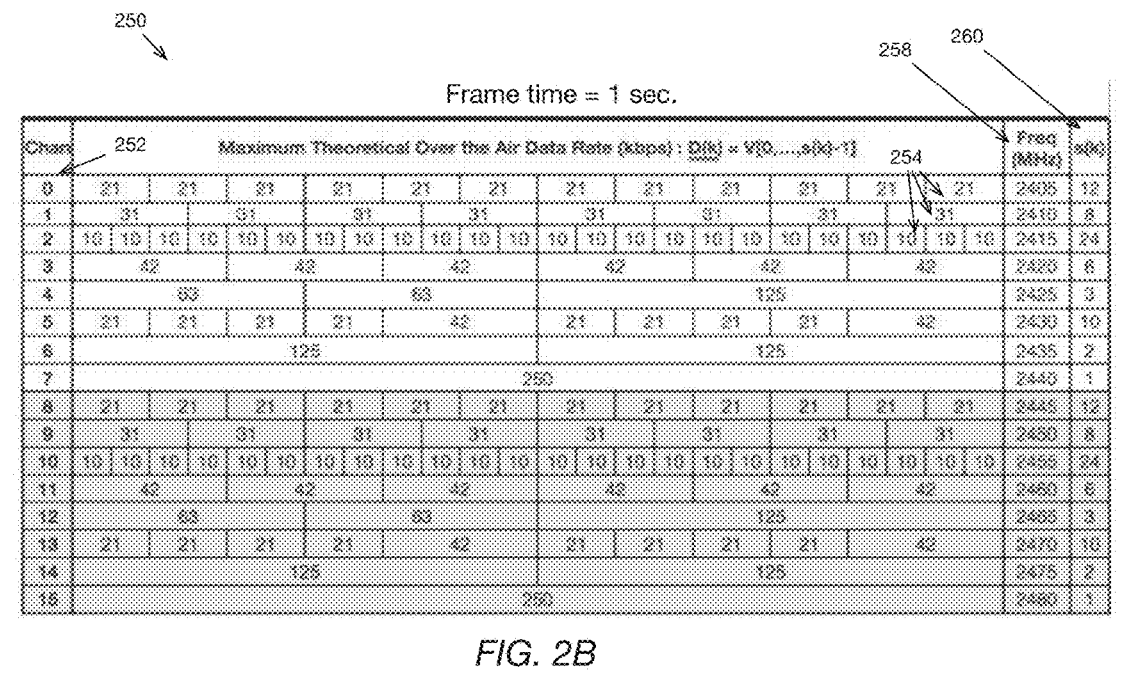

FIG. 2B is an example of a channel allocation schedule 250 for allocating time slots in 16 channels 252 across one frame having a frame time of 1 second. The 16 channels 252 correspond to frequency bands 258, which in the example shown in FIG. 2A correspond to the frequency bands defined by IEEE 802.15.4. Each channel 252 is divided into a number of time slots, s(k), at 260, where k is a function of time and frequency:

$$k = nT_f f \qquad (1)$$

The slots, s(k), at 260 are used by network nodes in time-division multiplexed access (TDMA) format based on a frame. In general, the channel allocation schedule 250 has the structure of a matrix, D(t,f):

$$D(t,f) = V[s(nT_f f)]_{802.15.4} \qquad (2)$$

where:

| | |
|---|---|
| D | The D-matrix is a matrix of slots in the raw physical available bandwidth over time and frequency (channels). Application level network functions (packets) are logically allocated slots in the matrix for transmission over the network. |
| $V[s]_{802.15.4}$ | Represents variable allocation of TDMA slots for a given 802.15.4 set of physical channels. |
| t | Independent variable of time where:<br>t = $nT_f$ |

| | |
|---|---|
| f | Independent variable of frequency (f is an integer (0-15) corresponding to an 802.15.4 channel 11-26). IEEE 802.15.4 specifies sixteen 5 MHz frequency bands for the 2.4 GHz physical layer specification |
| $s(nT_f, f)$ | Slots that can be allocated from a given channel and a discrete time slots as shown below. (Note that the granularity of the time slots, given by $T_f$, can be either uniform over frequency f, or can vary by each channel frequency. |

The channel allocation schedule 250 in FIG. 2B shows a number of time slots s per frame (at 254) in each channel. The time slots represent a division of the maximum data transfer, or throughput, rate into smaller portions of the bandwidth. The sixteen channels defined by the IEEE 802.15.4 specification communicate at a raw 250 kbps for a 4 μsecond bit time. While the radios operate at the full 250 kbps speed, the throughput in each time slot is reduced by how k, the slot division logic, is defined for each channel. Channel 0 in the channel allocation schedule 250 is divided into 12 time slots each having a maximum data throughput rate of 21 kbps. Channel 1 is divided into 8 time slots each having a throughput rate of 31 kbps. Channel 6 is divided into 2 slots each having a throughput rate of 125 kbps, and Channel 7 is a single slot through the one second frame at the maximum data throughput rate of 250 kbps.

Those of ordinary skill in the art will understand that the channel allocation schedule 250 is described for an example network operating under the IEEE 802.15.4 specification as an example implementation. Other example implementations may involve any other number of channels at different frequency bands and a different maximum data transfer rate for each channel. For example, even within the IEEE 802.15.4 specification, radios may operate in "turbo mode" where a signal with a slightly degraded signal to noise ratio is tolerated to achieve data throughput rates of 700 kbps, 1 Mbps, or even as high as 2 Mbps. In other examples not involving the IEEE 802.15.4 standard, the channels may be defined at different frequency bands with different maximum throughput rates, but may still be divided into time slots for a TDMA-based allocation according to the D-matrix described above.

It is noted that the throughput rates indicated for each time slot in the channel allocation schedule 250 in FIG. 2B may be a value that is rounded from a more precise throughput rate based on the 250 kbps maximum data throughput rate for the IEEE 802.15.4 standard. For example, 21 kbps in the time slots defined for channel 0 is rounded up from 20,833 bps so that the 12 slots in channel 0 correspond approximately to the 250 kbps maximum throughput rate for IEEE 802.15.4 channels.

Referring back to FIG. 2A, the network nodes 106 with data to transmit begin to request channel resources to communicate on the communication medium 104. At step 204, the server 102 receives a request from a particular network node on one of the plurality of channels. The request includes a bandwidth requirement indicating the data volume (or amount of data) that the network node will be communicating along with a periodic rate at which the data volume is to be communicated. At step 206, the method 200 identifies at least one time slot within a frame corresponding to the throughput request. For example, a network node having 20,833 bits of data to transmit every second may be allocated a free 21 kbps slot in channel 0 in each frame (frame time=1 second). In another example, a network node having 70 kb of data to transmit every second may be allocated a free 42 kbps time slot in channel 3 and a free 31 kbps non-overlapping time slot in channel 1 in each frame.

At step 208, the method 200 generates a channel resource allocation message identifying a channel and at least one time slot within the frame time. The channel identified is typically the same channel used by the network node to transmit the request for resources. More than one channel may be identified in the message. The channel resource allocation message may also include information about the channel, such as the number of time slots per frame in the channel, and the transfer rate for each time slot. The channel resource allocation message is sent to the requesting network node, and the network node communicates on the identified channel or channels according using TDMA to access the channel.

In generating the channel allocation schedule, the server 102 may be provided with an approximate number of network nodes and the general bandwidth requirements of the network nodes. During initialization of the wireless node network 100, the server 102 receives requests from the network nodes on a random basis. As channels and time slots are allocated, the channel allocation schedule gradually fills up. As the number of network nodes requesting resources is gradually reduced, the wireless node network reaches a steady state. As the channel allocation schedule reaches steady state, the channel allocation schedule may not have sufficient resources on a given channel to allocate to a requesting network node. In the case of insufficient resources on a given channel, the server 102 may harvest other channels for time slots sufficient to cover the bandwidth request on an algorithmic basis. This algorithm can be varied based on priority, different network requirements, or changing conditions such as maturity of the technology employed by the network. The server may remove allocated slots to different nodes either temporarily or permanently in performing such algorithms. Example implementations of methods for allocating channel resources when un-allocated resources are becoming less available are described in more detail below with reference to FIGS. 6A-6G

In some example implementations, the steady state may be upset by the addition of network nodes or by the modification of the bandwidth requirements of at least some of the network nodes. For example, during operation of the wireless node network 100, a set of network nodes may be added to the node network. As the network nodes request channel resources as described above, the steady state is upset and the network nodes that have been allocated channel resources will experience communication collisions on the communication medium 104. The network nodes may process the communication collisions as errors and notify the server 102 via an error message.

The server 102 may respond to the error message by re-allocating channel resources on different time slots and, if necessary, on a different channel. This response would be similar to the response to a network node requesting channel resources on a specific channel, but receiving channel resources on a different channel. The server 102 receives the error message and refers to the channel allocation schedule for at least one time slot within a frame that corresponds to the bandwidth requirement of that network node. A sufficient number of time slots may be found on a second channel, although it is possible that no single channel has enough time slots to provide a sufficient transfer rate for the network node. The server 102 may allocate time slots from one channel and time slots from another channel to the network node.

It is noted that channel resource allocation by the server 102 proceeds automatically. Network nodes 106 initialize their operation independently at anytime and request channel resources when ready to communicate data. Network nodes 106 request time slots on which to access a selected channel using TDMA and CMSA access schemes. As such, the channel allocation schedule may be referred to as a TDMA over CSMA or TDMA over CSMA-CA or TDMA over CSMA-CD.

Because the number of network nodes and the bandwidth requirements of network nodes can change, the server 102 is able to adapt to the changes automatically by re-allocating resources in response to the changes. The server 102 adapts by making modifications to the channel allocation schedule (such as the example channel allocation schedule 250 in FIG. 2B). Such modifications may entail re-assigning time slots and/or channels to network nodes experiencing for example, an excessive number of collisions when attempting to communicate on their allocated time slots and channels. Allocation of time slots is therefore variable. The channel allocation schedule may therefore be referred to as a Variable Allocation TDMA scheme (or VA-TDMA).

In general, the channel allocation schedule 250 may be configured to serve network nodes communicating in the following transfer modes: 1) steady state, 2) event-driven, and 3) bulk transfer. Network nodes 106 may operate in one ore more of the transfer modes depending on the individual needs of the nodes 106 at any given time. Network nodes 106 operating in a steady state mode transfer data at substantially regular intervals during the channel and time slot(s) allocated to them according to the bandwidth requirements of each network node 106. When all network nodes 106 are operating in a steady state mode, the channel allocation schedule is also in a steady state condition. Network nodes 106 that operate according to the bandwidth requirements on which their channel resources were allocated may be referred to as "steady state network nodes."

Network nodes 106 may also transfer data in an event-driven mode. Network nodes 106 may be configured to sense, or respond to events, such as the press of a button, a system fault, an actuation of a security latch, the tripping of a proximity sensor, or other similar, random events. Event driven transfers of data are thus bursts of data that can occur at any time. When a network node 106 has event driven data to transfer, it may be referred to as an "event driven node." Event driven nodes may not have allocated channel resources for events, or even at all, and may need to attempt to transfer data on a selected channel in any slot whether it is allocated or un-allocated. That is, event driven nodes operate using CSMA regardless of the time-division of the channels.

The bulk transfer mode may entail transfer of data in amounts and at times that may not conform to a network node's allocated resources. Some network nodes 106 may require over the air (wireless) updates, or may need to perform a bulk uploading of stored data (such as data logs), or due to some other event may need to upload data in amounts different (typically larger) from what the server 102 previously expected based on the reported bandwidth requirements. Network nodes 106 that have large volume transfer requirements, or for which bandwidth requirements increase substantially may be referred to as "bulk transfer network nodes." Network nodes 106 may perform a bulk transfer by requesting channel resources as described for steady state nodes. The request for channel resources may include an indication that the network node 106 is performing a bulk transfer in communicating bandwidth requirements. The bulk transfer indication would be used by the server in prioritizing the channel resource allocation, particularly when the channel allocation schedule is reaching capacity.

A new network node added to the wireless node network 100 may be added with bandwidth requirements indicating parameters, such as, for example:

1. Data volume per transfer—the amount of data expected to be communicated in each data transfer;
2. Data transfer periodic rate—the rate or frequency of expected data transfers;
3. Priority—an indication of the priority of the data transfer relative to that of other network nodes, priority may be application-based priority or on type of transfer, for example, bulk transfers may have a priority higher than steady state transfers;
4. Event-driven transfer requirements-network nodes may occasionally need to transfer data in an event-driven mode and indicate expected data volumes and frequency in the bandwidth requirements or some other parameter in the requests;
5. Channel List-A list of channels preferred by the network node based on sensing traffic on the communications medium or on attempts to transmit the request for channel resources on the channels; and
6. Service time range-a network node may be actively transferring data in a time range and not be active outside such time range.

It is noted that the above list is provided as examples of the type of information that may be included in a bandwidth requirement. A request for channel resources may include other parameters or types of information that may be used by the server to allocate channel resources. For example, the channel resources request may include parameters such as, for example a transfer type, such as steady state or bulk, which may be provided to indicate priority in place of, or along with, a priority parameter. Whether a node is of a bulk type or steady state type may also be discerned by the server from the bandwidth requirements (high volume of data within a short period of time). If the bandwidth requirements indicate the request is from a steady state network node or from a bulk transfer node, the method 200 continues at step 206 as described with reference to FIG. 2A.

Figure 2C:
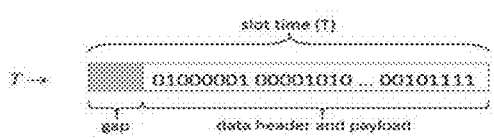
FIG. 2C is a schematic diagram illustrating a timeslot with a gap defined therein.

As noted above, event driven nodes may not attempt to obtain channel resources as described with reference to FIG. 2A. Event driven nodes may simply attempt to transfer data using a CSMA scheme. The channel allocation schedule 250 may be configured to allow for some random data transfers by event driven nodes without requiring channel resource allocation. A gap in at least one time slot may be identified in the channel resource allocation message to carry the data volume that may typically be part of an event driven data transfer. FIG. 2C shows an example of a timeslot that may be defined for a typical channel structure. The time slot is defined by its assigned time period, T, in FIG. 2C. The time period, T, includes a string of bits comprising the data communicated in the time slot, which may include one or more packets having a data header and payload. The time period, T, may also be padded with a gap time.

In an example implementation, the gaps in a time slot may be provided as a general overhead mechanism in the network in order to accommodate the amount of random traffic that may be needed on any given channel. In configuring time slots in channels according to the D-Matrix scheme described above with reference to Eqn 1, the peak available throughput may be de-rated by an amount of anticipated gap needed by that channel to accommodate an expected rate of event driven messages. Network nodes 106 joining the wireless node network 100 may specify steady state and event driven payload message requests/requirements to the server 102. The server 102 may also track usage of each channel's resources for event driven data transfers. Once the network node 106 joins the network, the even driven messages could come at any time and the success of those messages will automatically be governed by the margin of overhead in the network.

In an example implementation, the server 102 may track channel usage for a channel and determine an event-driven traffic percentage indicating the percentage of the total traffic communicated on that channel that is event-driver. The server may then determine a de-rated throughput value that adjusts a gap time in each slot in each time frame. The de-rated throughput value may be determined by the server 102 by analyzing a history of gap time settings and changes in the volume of event-driven data being communicated over time. The throughput for each time slot in that channel is then set to the de-rated throughput value.

Figure 2D:
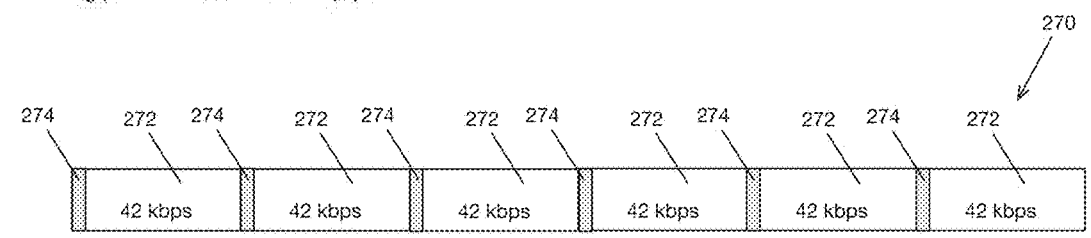
FIG. 2D is a schematic diagram illustrating an adjustment to gap times by de-rating throughput of a time slot in a channel to provide resources for event-driven data transmissions.
Figure 2D:
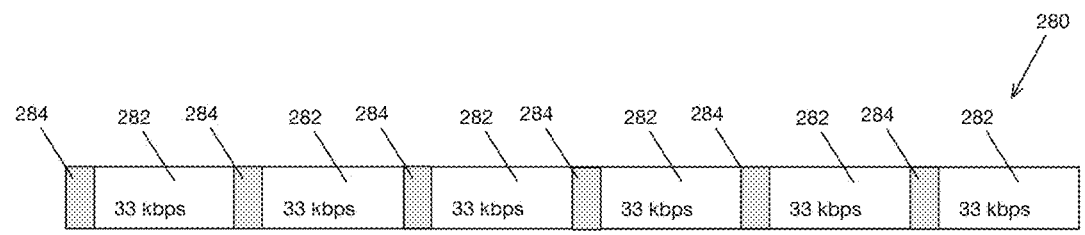

FIGS. 2B and 2D illustrate an example of a method for configuring a gap time by de-rating the throughput of a slot with reference to Ch. 3 as shown in FIG. 2B. FIG. 2D shows a first frame 270 in Ch. 3 having slots 272 with a throughput of 42 kbps and a first gap time 274. The server may track the usage of the slots 272 in Ch. 3 and monitor the volume of data communicated on event driven transmissions. Based on the usage tracked by the server 102, the server 102 may estimate that channel 3 may be shared by network nodes for which about 10% of the traffic comprises random event driven messages. The slots 272 with a 42 kbps throughput could be de-rated by about 20% and the throughput of each slot 272 in channel 3 reduced to six slots of 33 kbps. FIG. 2D shows a second frame 280 having slots 282 with throughput of 33 kbps each. The de-rating of the throughput of each slot 282 allows for an increased gap time 284. This increase in gap time 284 may provide a general probability of about 0.2 that any random event communication will succeed with no collision. Each CSMA random back-off transmission that occurs (typically limited to 5 attempts before failure) will have a 0.2 probability of a secondary collision. Over 5 randomly spaced transmission attempts, the probability approaches $P=1.0$ that the random communication event will succeed.

In the example illustrated in FIGS. 2B and 2D, the de-rating of the throughput by 20% based on 10% event-driven traffic may be an arbitrary pad value. Other values may be used depending on the amount of observed event-driven traffic. The arbitrary pad value may be adjusted based on analysis of gap effectiveness in providing throughput for event-driven communications through long term data gathering.

Figure 3A:
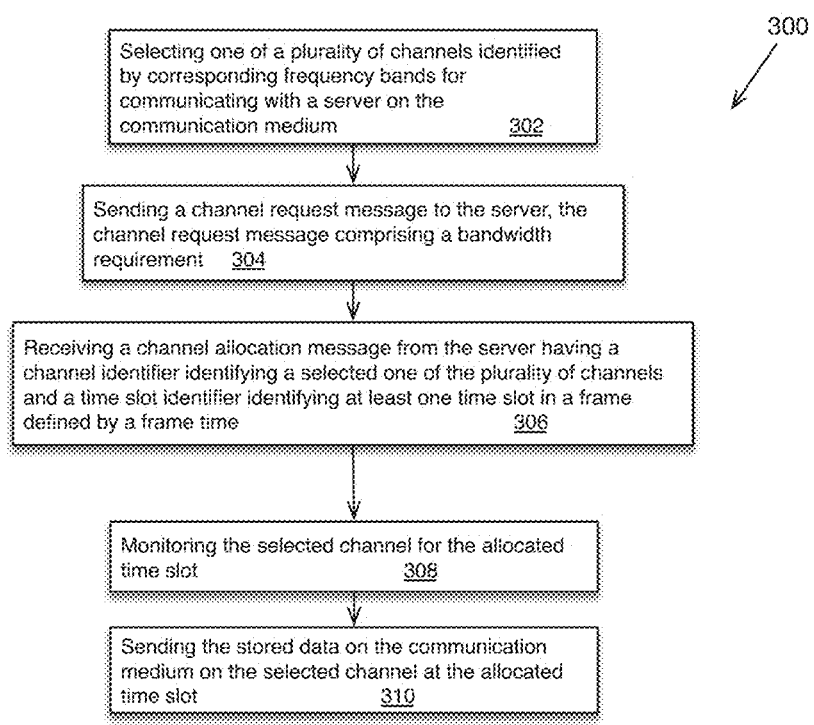
FIG. 3A is a flowchart illustrating operation of an example of a method used by a network node to obtain channel resources.

As noted above, the network nodes obtain access to the channels by sending requests for channel resources to the server. FIG. 3A is a flowchart illustrating operation of an example of a method 300 used by a network node for accessing a communication medium. The method 300 may be performed by the network interface 160 (FIG. 1) of a network node during initiation of operation of the network node. The network node may begin by connecting on each channel and inputting signals to identify one or more channels communicating the least amount of data. At step 302, a channel is selected from among the channels communicating the least amount of data.

Figure 3B:
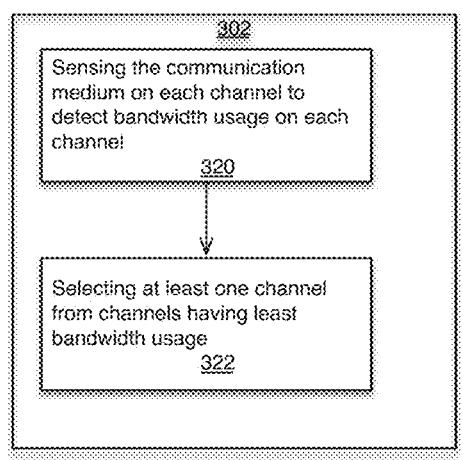
FIG. 3B is a flowchart illustrating operation of an example of a method for selecting a suitable channel for requesting channel resources.

FIG. 3B is a flowchart illustrating an example method for selecting a channel. At step 320 as shown in FIG. 3B, the network node senses the communication medium 104 (FIG. 1) to detect the extent to which the bandwidth of each channel is being used. The network node may sense the communication medium 104 by receiving data on each channel for a certain time period. The received data is then analyzed and compared to available throughput to determine how much of the throughput is available on the channel.

In an example implementation, the network node may sense traffic on each channel and compare the channels to generate a list of channels having the least amount of traffic. The list may be prioritized according to the channels that offer the best service based on the traffic on each channel. The network node may provide the channel list to the server 102 in making a request for channel resources, or may continually update the list as backup channels. If the network node provides the list to the server 102, the server 102 may store the list in an allocation record for the network node. The server 102 may also include a ranked channel list that includes a primary channel, a secondary channel, and a tertiary channel in the channel resource allocation message to the network node in response to the request for channel resources by the network node. The ranked channel list may be used for secondary and tertiary failover. An example of secondary and tertiary failover is described below with reference to FIGS. 6A-6G.

To illustrate the example implementation of a request for channel resources by a network node that provides a channel list, a network node sends the channel list as for example, a quality of service vector indicating a priority of channels based on their ranked quality of service. Referring to the channel allocation schedule 250 in FIG. 2B, the quality of service vector (i.e. QoS vector) may include channels 3, 9, and 12, and may be represented as [3 9 12]. The QoS vector is sent to the server 102 along with the bandwidth requirement, which may be, for example, 35 kbps. The server 102 then compares the allocation schedule for channels, 3, 9, and 12. The comparison may be performed in the order shown in the QoS vector. For purposes of this example, channel 3 has a throughput of 42 kbps as shown in FIG. 2B, but has all of the channel 3 slots allocated; channel 9 has a throughput of 31 kbps and has 2 non-adjacent slots available; and channel 12 has a throughput of 63 kbps with only one slot available. The server 102 ranks the above resources as [12 9] and may send the ranking back to the requesting network node along with a particular slot allocation on channel 12, and two slots on channel 9 as a secondary channel.

The network node advantageously receives the ranked resources and communicates on the identified slot on channel 12 as a primary channel. If the network node experiences excessive failures on the primary channel, the network node may perform a secondary failover and begin to communicate on the secondary channel (i.e. the assigned two slots on channel 9). If the server 102 had identified free slots in all three channels that would meet the network node bandwidth requirement, the ranked channel list may be sent back to the network node as [12, 9, 3], for example. The network node would then have a primary channel, a secondary channel, and a tertiary channel. The tertiary channel would provide the capability of tertiary failover in case data transfers on the primary and secondary channels fail.

It is noted that the example QoS vector described above ([3, 9, 12]) produced a ranked channel list of [12, 9] due to the lack of resources available in channel 3. The ranked channel list with only two channels [12, 9] provides a slightly degraded best available scenario where the requesting network node can only get secondary availability. If the wireless node network is operating with tertiary failover capability, it may be necessary to trade resources for full tertiary failover availability. The requesting network node can make another request for resources on a $4^{th}$ channel that was not on the original list of [3 9 12] to re-establish tertiary failover capability. The network nodes can continue this process until a steady-state determinism of availability and bandwidth is reached.

At step 322 in FIG. 3B, at least one channel with the least amount of bandwidth usage is selected. The selection may comprise a channel list as described above. In an example implementation, the channel list includes a primary channel, a secondary channel and a tertiary channel. Referring back to FIG. 3A, the network node sends a channel request message to the server. The channel request message includes a bandwidth requirement, which may include any of the parameters listed above. The channel request message may also include a channel list indicating a primary channel, a secondary channel and a tertiary channel. The server may store this channel list corresponding to the network node in allocating channel resources to the network node.

At step 306, the network node receives a channel allocation message from the server having a channel identifier identifying a selected one of the plurality of channels and at least one identifier of at least one time slot in a frame defined by a frame time. The network node uses the channel resources in the channel allocation message to communicate data on the communication medium 104 (FIG. 1). During operation, the network node, such as the sensor node, Node 1 106a, collects data sensed by its sensors 152 and stores the data for communication to the server. At step 308, the network node monitors the selected channel for the allocated time slot. The network node may sense the beginning of a frame and begin timing time slots in the frame. When the allocated time slot is detected by the timing of the frame, data formatted by the network node for transmission is sent on the communication medium on the selected channel as shown at step 310.

The network node monitors the channel using a CSMA, which may be a CSMA/CD (Collision Detect) or a CSMA/CA (Collision Avoidance). The network node also accesses the channel in time slots allocated to the network node by the server 102 according to a TDMA scheme. The TDMA scheme provides the network node with a high probability that the channel is available. However, because the wireless node network 100 operates on an ad hoc basis, the CSMA scheme may be used to signal changes to which the wireless node network 100 responds automatically. For example, collisions may occur as the wireless node network grows or network nodes change modes of operation (from steady state to event driven). A network node may detect and track collisions, or potential collisions sufficient for the network node to have to wait for another time slot. The network node may send an error message to the server 102 when a threshold number of collisions have been detected.

In an example implementation, the network nodes 106 may track other types of erroneous parametric conditions other than collisions and report the data about these conditions in error messages to the server 102. For example, the server 102 may send timing correction messages to the network nodes 106 that include a system time to which the network nodes 106 synchronize their internal timing mechanisms. The network nodes 106 receive the timing correction messages and synchronize their timing mechanisms with the system time. The network nodes 106 may also determine a timing error as the difference between the internal time of the network node and the system time provided by the server 102. While the network node may always detect a non-zero timing error, a timing error that is greater than a predetermined time error threshold may be reported to the server 102 as an error.

Figure 4:
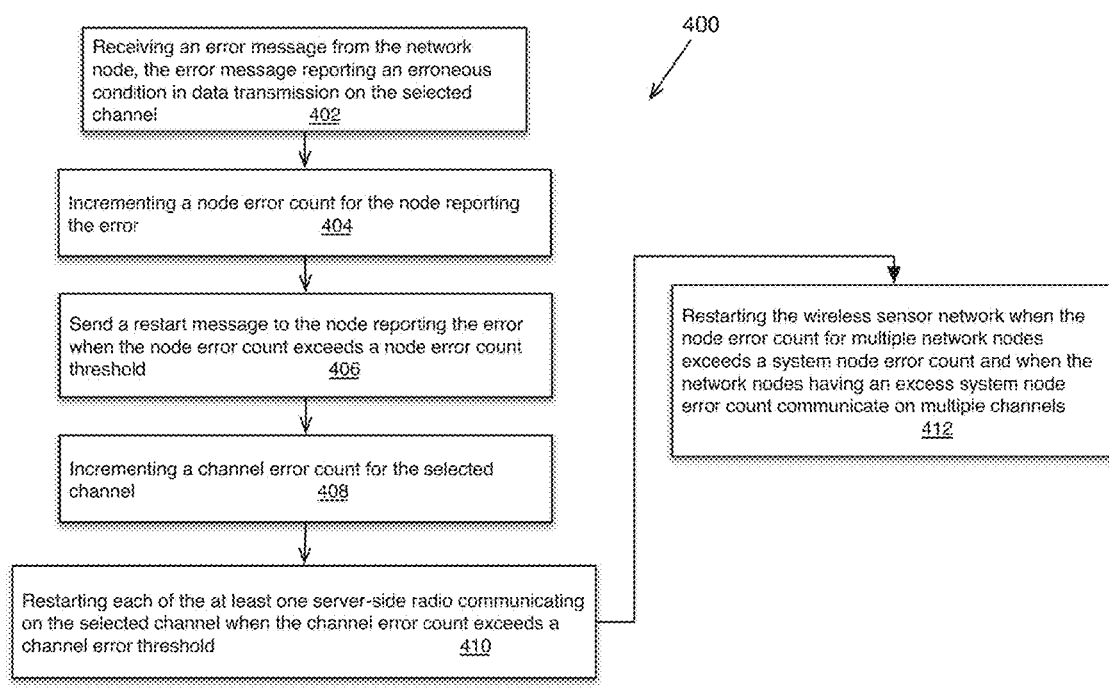
FIG. 4 is a flowchart illustrating operation of an example method for handling errors in a wireless sensor network.

The server 102 may use the error message information to re-allocate resources for the network node reporting the error message. The resource allocation may proceed between individual network nodes and the server. For example, network nodes may perform secondary and tertiary failover when data transmissions fail. Examples of secondary and tertiary failover are illustrated below with reference to FIGS. 6A-6G. The server 102 may use the error messages to monitor the overall health of the communications medium 104 and perform curative actions in response. FIG. 4 is a flowchart illustrating operation of a method 400 for handling excess error conditions in data transmissions between the server 102 and the plurality of network nodes 106. The method 400 in FIG. 4 as described below, is assumed to be implemented by an example of the wireless sensor network 100 in FIG. 1 unless stated otherwise. In addition, it is noted that the server 102 may include one or more server-side radios for communicating on each channel. In an example implementation, the one or more radios may be implemented on wireless data concentrators such as the wireless data concentrators described below with reference to FIGS. 6A-6G.

In an example implementation, the server 102 monitors the performance of the network nodes in the wireless sensor network and handles error conditions on three levels. First, the server 102 monitors errors reported by each network node. While a network node may perform a secondary or a tertiary failover in response to communications errors, erroneous conditions may be reported to the server 102 in monitoring the overall health of the wireless sensor network. The server 102 may intervene in the performance of each network node according to error reporting by each network node. On a second level, the server 102 may monitor the performance of each channel. Errors reported by each network node may be analyzed on a per channel basis. Based on an accumulation of erroneous conditions on a given channel, the server 102 may determine that the overall health of the channel requires intervention. The server 102 may effect such intervention by controlling the operation of the server-side radios communicating on a given channel. On a third level, the server 102 may use the error messages reported by the network nodes to assess the overall health of the wireless sensor network. If too many errors are reported on multiple channels by multiple network nodes, the server 102 may determine that the overall health of the wireless sensor network may require intervention. Such intervention may take the form of performing a restart of the entire network.

FIG. 4 illustrates operation of the server 102 at the three levels of described above. At step 402 in FIG. 4, the server 102 receives an error message from the network node 106 reporting an error. The error message may report any error condition, such as excess collisions, internal timing errors, or other erroneous conditions that may not be fatal, but merely indicative of potential problems in data transmissions over the communications medium 104. At step 404, the server may maintain and increment a node error count for the network node reporting the error. The server 102 may maintain a node error count for the network node reporting the error as well as other network nodes communicating on the wireless sensor network. At step 406, the server may send a restart or shutdown message to the network node reporting the error when the node error count exceeds a node error count threshold. The network node may receive the shutdown or restart message and perform a system restart, or at least a restart of the radio on the network node. At step 408, the server may maintain and increment a channel error count for the selected channel corresponding to the network node reporting the error message. The server 102 may maintain a channel error count for each channel. At step 410, the server may restart or disable each of the one or more server-side radios communicating on the channel of the network node reporting the error when the channel error count exceeds a channel error threshold. The channel error threshold may be dependent on a specific application environment. Errors may also be weighted such that more critical errors have a higher priority than less critical errors. The weighting of the errors may also be used to determine if the server-side radios should simply be disabled rather than restarted. At step 412, the server 102 may restart the wireless sensor network if the node error count for multiple network nodes exceeds a system node error count and when the network nodes having an excess system node error count communicate on multiple channels. The system node error count may be the same as the threshold for the node error count that may result in a restart of a network node. The system node error count may also be less than the threshold for the node error count since it entails errors on multiple nodes communicating on multiple channels. The number of channels on which errors are reported may depend on the extent to which the throughput and determinism of the media access is affected.

The disabling of the one or more radios communicating on the selected channel starves the channel of any radios. This starvation mode may cause network nodes to either failover to an alternative channel, or perform a soft reset, that will cause the network nodes to re-join the network. At step 408, each of the at least one radios is restarted. The at least one radio on the selected channel may then communicate with the network nodes attempting to re-join the network. For example, the radios may receive another request for channel resources from each of the network nodes that had been communicating on the selected channel.

The plurality of network nodes 106*a-n* in FIG. 1 may include network nodes having a wide variety of bandwidth requirements. Some network nodes 106*a-n* may require the capacity to transmit 10 kb every second, or every 5 seconds, or even every 10 seconds. Such low bandwidth network nodes may be regarded as having a low priority compared to network nodes that have as much as 250 kb to transmit every second. The priority of the network nodes for allocating capacity may decrease as the time periods between which the 250 kb is to be transmitted increases. Still other network nodes may have 100 kb to transfer over a period of 1 second in every 10 seconds of time. If a 100 kbps time slot is unavailable, multiple slots of less than 100 kbps may be provided to such a network node in a one second period every ten seconds. Some network nodes may be tolerant to latency in delivering data, while others may not be so tolerant.

The channel allocation schedule 250 in FIG. 2B may be modified to provide flexibility in allocating channel resources to network nodes with such diverse bandwidth needs. The channel allocation schedule 250 in FIG. 2B defines a frame to have a frame time of 1 second. The maximum data throughput for any channel in the channel allocation schedule 250 is therefore the maximum data transfer of the channel, which is 250 kbps specified in the IEEE 802.15.4 standard 2.4 GHz physical layer provision. Each channel is then divided into a number of time slots specific to each channel and each time slot has a transfer rate based on the number of time slots. FIG. 5A is another example of a channel allocation schedule 500 where each frame 506 has a frame time of 10 seconds. The channel allocation schedule 500 identifies each channel 502 and how the time slots 504 are defined for each channel. The frames 506 are shown in divisions of one second for purposes of illustrating the derivation of the transfer rates of each time slot 504. Only two seconds worth of time slots 504 are shown, however, the time slots 504 in the remaining 8 seconds 510 are defined to have the same number of time slots 504 in each second as the two seconds illustrated in FIG. 5A. It is noted that the smallest time slots 504 are defined for channels 0, 3, 6, 8, 11, and 14 as providing 10 time slots per second resulting in a transfer rate of 25 kbps in each time slot. The next smallest time slots 504 are defined for channels 1, 4, 9, and 12 providing a transfer rate of 50 kbps in five time slots per second. Channels 2, 5, 10, and 13 provide a transfer rate of 125 kbps in two slots per second. Channels 7 and 15 provide 250 kbps in a single time slot per second. It is understood by those skilled in the art of radio programming that the above rates are peak rates and that effective data payload throughput is reduced by RF preambles, packet overhead such as addressing, acknowledgement and security considerations. These considerations are taken into account by the server request/response allocations.

The channel allocation schedule 500 in FIG. 5A may be empty at start-up of the server 102 (FIG. 1). The server 102 may store a table, or database, with data structures corresponding with each time slot in each channel. A state may be defined for the time slot data structures indicating whether the time slot is allocated or unallocated. If allocated, the data structure may indicate a node identifier identifying the network node to which the time slot is allocated. The data structure may also include information from the bandwidth requirements communicated to the server 102 when the request for channel resources was made by the network node. The bandwidth requirement information may include a priority, a data volume, a communication periodic rate, and a second order frequency. While the bandwidth requirement may be specified as a simple transfer rate, network nodes may have different duty cycles for transferring data. Time slot allocation would be more efficient if the bandwidth requirement includes the data volume to be communicated a particular communication periodic rate within a frame time, for example. A second order frequency may be provided for network nodes that communicate a data volume in a frame time between periods of several frame times.

Figure 5B:
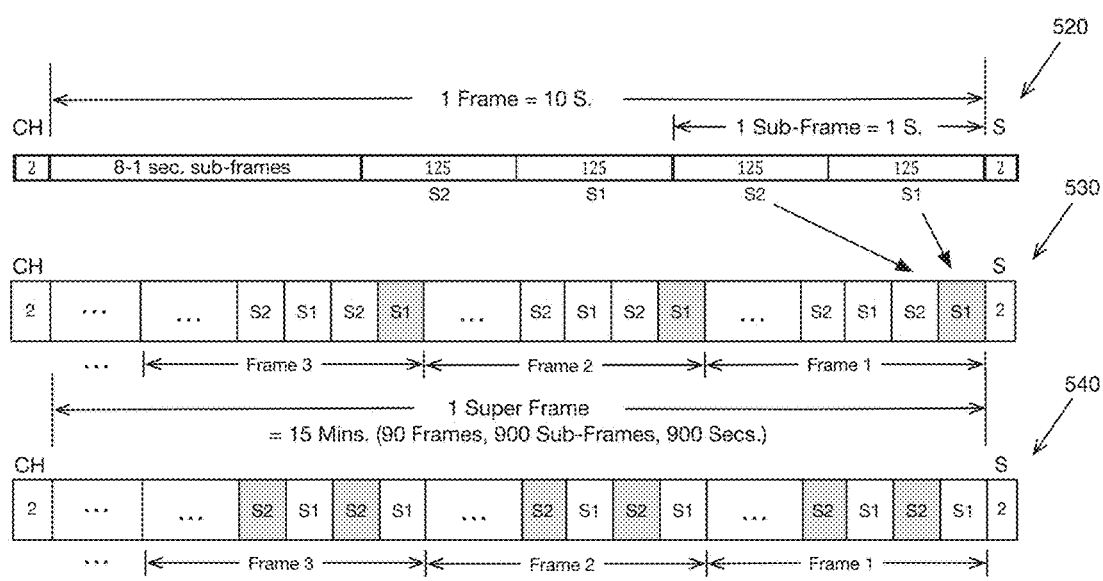
FIG. 5B is a schematic diagram illustrating examples of the allocation of timeslots in a selected channel in the channel allocation schedule illustrated in FIG. 4A.

The channel allocation schedule 500 is empty at start-up, but is filled as network nodes request channel resources. FIG. 5B is a schematic diagram illustrating examples of the allocation of timeslots in channel 2 in the channel allocation schedule 500 illustrated in FIG. 5A. As shown at 520, channel 2 communicates s=2 time slots per second at 125 kbps, and 20 time slots over the 10 second frame time.

FIG. 5B illustrates the concept of a superframe at 530, which is defined as having a superframe time of 15 mins. The superframe at 530 includes 90 frames over a period of 900 seconds. The frames, Frame 1, Frame 2, and Frame 3 are shown with the first two seconds of each frame indicated as having a slot S1 and a slot S2. Each slot S1 and S2 are the 125 kbps time slots shown in the channel structure at 520. The superframe at 530 provides a mechanism in which time slots may be allocated for network nodes that tolerate a higher latency. For example, a network node having a low second order frequency and a low communication periodic rate within a frame defined in the bandwidth requirements described above may be allocated time slots in one or a few frames in each superframe.

Channel 2 at 520 indicates the channel may be divided further into subframes, where one subframe in the example in FIG. 5B is defined, for purposes of illustration, as one second. A subframe may be defined to be any time period smaller than the frame time (down to the limit of the granularity $T_f$). A subframe provides a mechanism in which time slots may be allocated for network nodes that require reduced latency. The bandwidth requirements of a network node may indicate a relatively high second order frequency, or a low second order frequency and a high communication periodic rate within a frame. Time slots may be allocated to such a network node in subframes.

Channel 2 at 530 indicates by a grey filling that slot S1 in Frames 1, 2, and 3 is allocated to a network node. Slot S1 in the remaining 87 frames of the superframe may be allocated to the same network node, or slot S1 in the remaining 87 frames may be allocated to up to 87 other network nodes depending on the bandwidth requirements specified when the network node requested resources. Channel 2 at 540 indicates by a grey filling that slot S2 in each of the first two one-second subframe in Frames 1, 2, and 3 are allocated to a network node. Slot 2 in the remaining one-second subframes of each of Frames 1, 2, and 3 may also be allocated to the same network node, or to different network nodes depending on the bandwidth requirements specified when the network node requested resources. In addition, the first two one-second subframes or all of the subframes in each of the 897 remaining frames in the superframe may also be allocated to the same network node, or to different network nodes.

It is noted that the frame time of 10 seconds, the superframe time of 15 minutes, and the subframe time of one second in the examples described with reference to FIGS. 5A and 5B are specified as mere examples. The frame time, the superframe time, and the subframe time may be defined to provide the optimal allocation of channel resources to the variety of network nodes that may be operating on the wireless node network 100. In addition, if the performance of the wireless node network 100 degrades such that there is a risk of upsetting the steady state, the server 102 may choose a suitable time to re-define the channel allocation schedule and restart the wireless node network 100. In re-defining the channel allocation schedule, the server 102 may change the number of time slots in each channel, change the frame times, change the superframe times, or change the subframe times.

It is further noted that prior to re-defining the channel allocation schedule and re-starting the wireless node network 100, the server 102 may perform a re-allocation of time slots or channels, or allocate multiple time slots and/or multiple channels to network nodes to maintain a steady state.

Figure 5C:
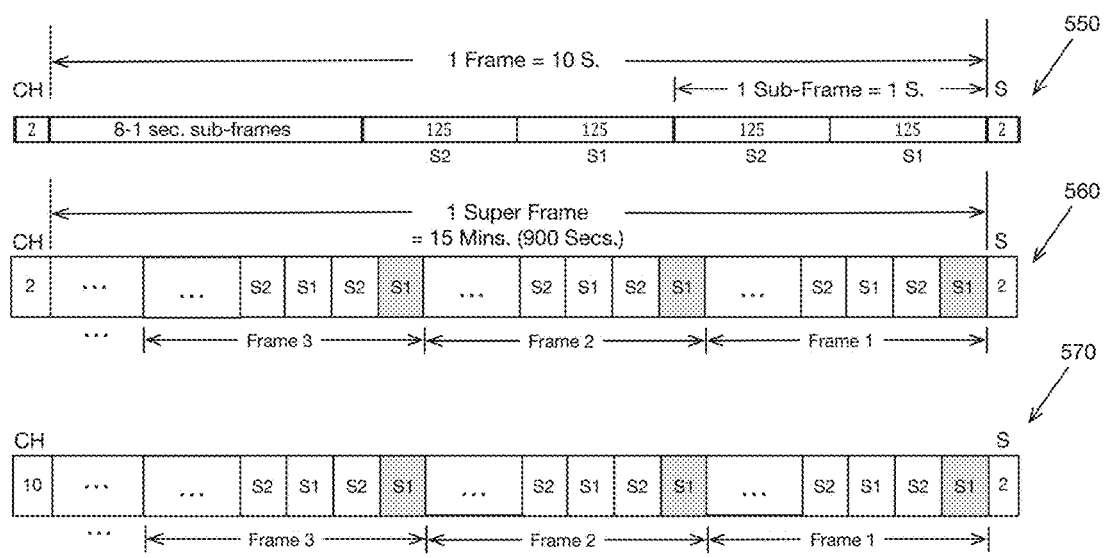
FIG. 5C is another schematic diagram illustrating examples of the allocation of timeslots in selected channels and the channel allocation schedule illustrated in FIG. 3A.

FIG. 5C is another schematic diagram illustrating examples of the allocation of timeslots in selected channels in the channel allocation schedule 500 illustrated in FIG. 5A with the superframe and subframe defined as shown in FIG. 5B. FIG. 5C illustrates allocation of channel resources to a network node that includes a request for redundancy, which may be indicated in the bandwidth requirements in the request for channel resources. Channel 2 at 550 includes two slots, S1 and S2 at 125 kbps in each one-second subframe. A network node requesting channel resources sufficient to communicate 125 kb in each ten second frame may be provided slot S1 in the first subframe of each frame of channel 2 as indicated by the grey filling of slot S1 in channel 2 at 560. When requesting redundancy, the network node may also be allocated slot S1 in the first subframe of each frame of channel 10, which also communicates in 125 kbps time slots. Once allocated the indicated time slots in channels 2 and 10, the network node communicates the same data on channels 2 and 10 simultaneously or in a priority failover scheme.

Figure 6A:
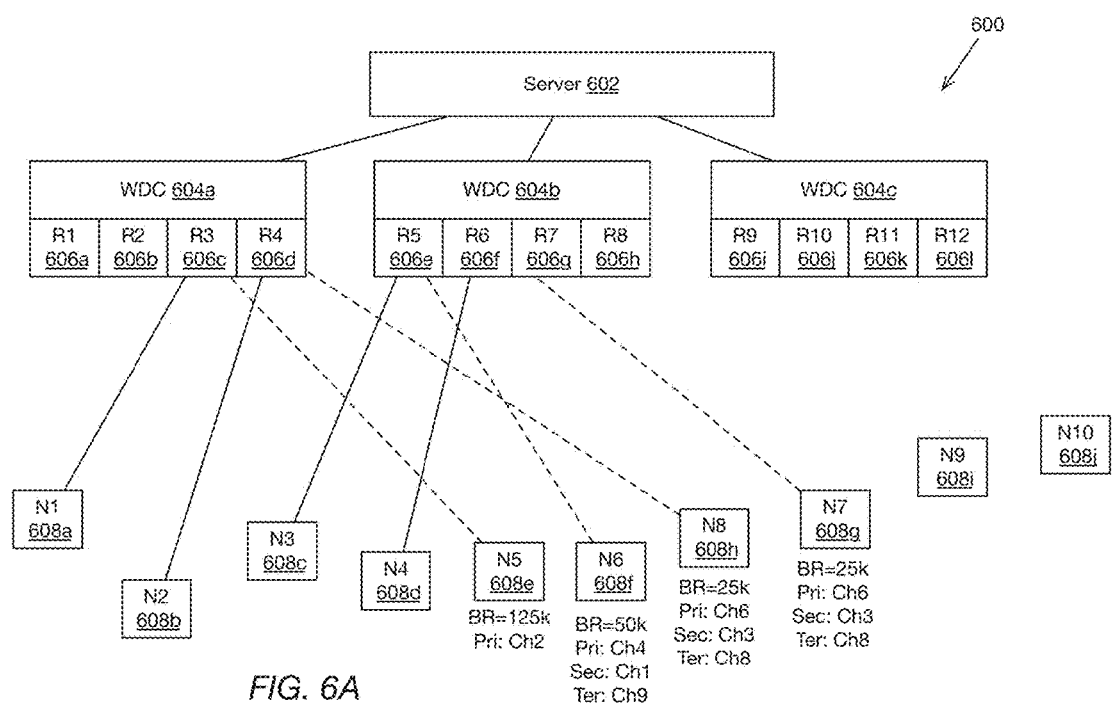
FIG. 6A is a schematic block diagram of another example of a wireless sensor network.

As described above, network nodes 106 may failover to alternative channels when data transmission errors occur. FIGS. 6A-6E illustrates examples for allocating channel resources and for performing secondary and tertiary failover during error conditions. FIG. 6A is a schematic diagram of a wireless sensor network 600 comprising a server 602, a plurality of wireless data concentrators ("WDC") 604*a,b,c* and a plurality of network nodes (N1-N9) 608*a-j* either having resources to communicate with the server 602 or prepared to request resources to communicate with the server 602. It is noted that the communication medium 104 in FIG. 1 is not shown in FIG. 6A. The communication medium in FIG. 6A is understood to be an over-the-air medium for wireless communications using radios.

Each WDC 604*a-c* includes at least one radio controlled by the server 602 to communicate on selected channels. The first WDC 604*a* includes radios R1-R4 606*a-d*. The second WDC 604*b* includes radios R5-R8 606*e-h*. The third WDC 604*c* includes radios R9-R12 606*i-l*. The wireless sensor network 600 in FIG. 6A includes three WDCs 604*a-c*, but more or fewer may be implemented in other example implementations. The server 602 may allocate one or more radios R-R12 to each channel in order to provide redundancy options for the plurality of network nodes N1-N9 608*a-l*. In the example shown in FIG. 6A, each radio R1-R12 606*a-h* is assigned one of the 16 channels described above in relation to the IEEE 802.15.4 standard 2.4 GHz physical layer provision. Another WDC may be added to connect to the server 602 with additional radios for the remaining channels.

FIG. 6B is a channel allocation schedule 610 showing each radio 612, a channel corresponding to each radio (at 614), a set of time slots 616 corresponding to each channel, and a number of slots (at 618) indicating the number of time slots per subframe of 1.0 sec. in each channel. Radio R1 608*a* (FIG. 6A) is shown in the channel allocation schedule 610 as being tuned to channel 0 and as having 10 slots with each slot having a throughput of 25 kbps. Radio R2 608*b* is tuned to channel 1 with 5 slots in each 1 sec. subframe. The frame time $T_f$ in the channel allocation schedule 610 is 10 sec. The slots in grey are intended to represent allocated slots. The white slots are intended to represent un-allocated slots.

As shown in FIG. 6A, the network nodes N1-N4 606*a-d* connect using solid lines to radios R3, R4, R5, and R6 to indicate the network nodes N1-N4 are in communication with the corresponding radios on corresponding WDCs. Network node N1 608*a* is shown in communication with radio R3 606*c* on WDC 604*a*. Network node N2 608*b* is shown in communication with radio R4 606*d* on WDC 604*a*. Network node N3 608*c* is shown in communication with radio R5 606*e* on WDC 604*b*. Network node N4 608*d* is shown in communication with radio R6 606*f* on WDC 604*b*. Network nodes N1-N4 608*a-d* are thus represented as having been allocated channel resources using, for example, methods as described above with reference to FIGS. 2A-3B. FIG. 6B indicates the slots and channels allocated to each of network nodes N1-N4 608*a-d*. Network node N1 608*a* is allocated the second 125 kbps slot in each 1 sec. subframe in channel 2. Network node N2 608*b* is allocated the first of 10 25 kbps slots in each 1 sec. subframe of channel 3. Network node N3 608*c* is allocated the first of 5 50 kbps slots in each 1 sec. subframe of channel 4. Network node N4 608*d* is allocated the first 125 kbps slot in each 1 sec. subframe of channel 5.

Figure 6C:
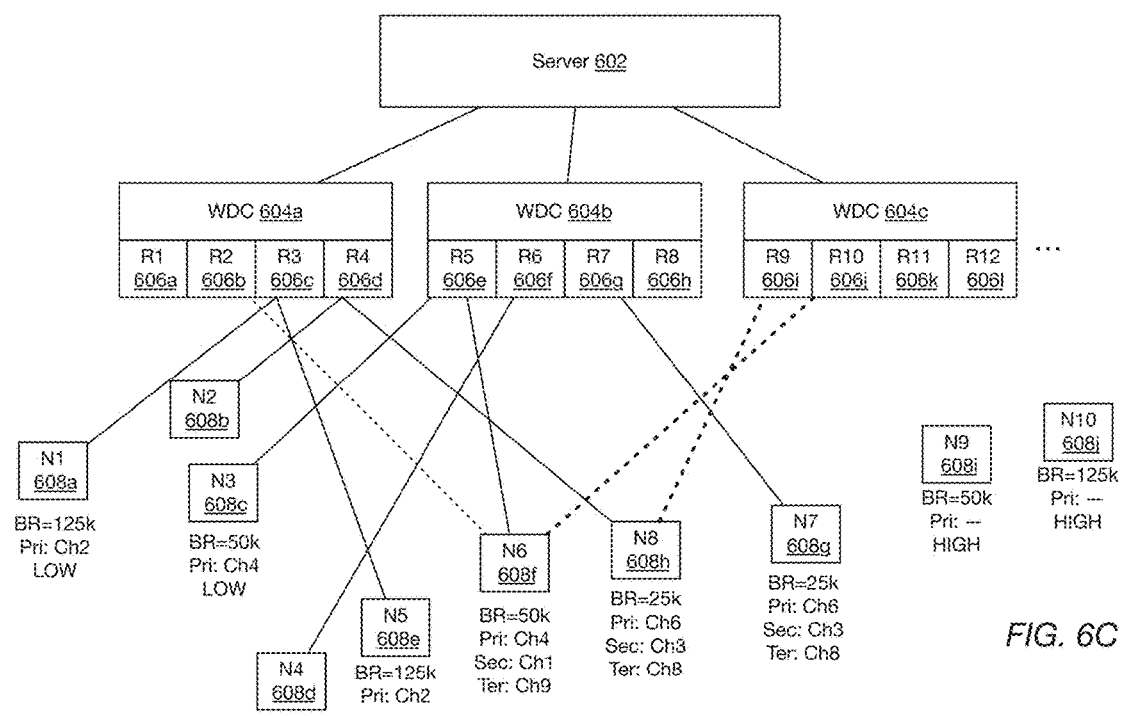
FIG. 6C is a schematic diagram of the wireless sensor network in FIG. 6A showing changes in allocation of channel resources to several illustrated network nodes.
Figure 6D:
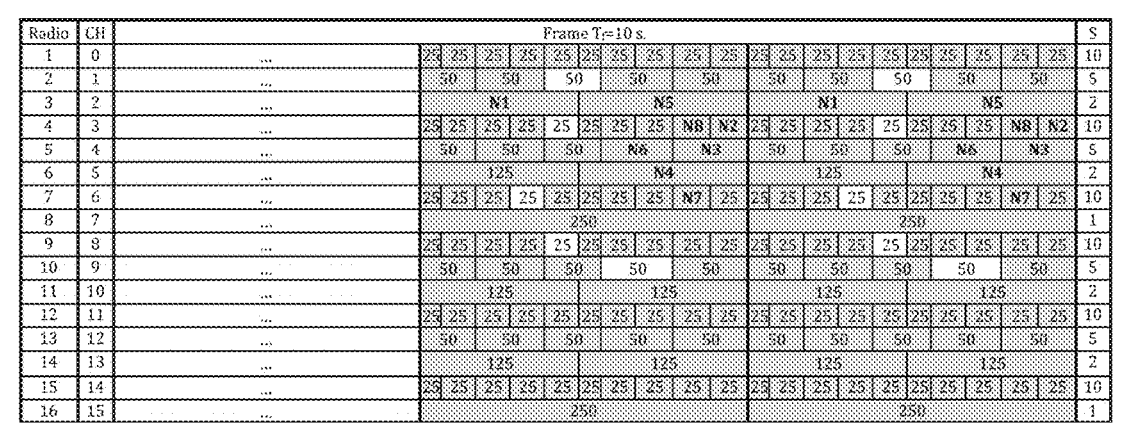

FIGS. 6A and 6C schematically illustrate how the wireless sensor network 600 changes as network nodes are allocated channel resources. FIGS. 6B and 6D illustrate these changes to the wireless sensor network 600 as reflected in the channel allocation schedule 610.

FIG. 6A shows network nodes N5-N8 608*e-h* having a tentative connection to radios R3, R5, R7, and R4 using dashed lines to indicate the network nodes N5-N8 are in the process of performing a request for channel resources with indicated bandwidth requirements. Network node N5 608*e* is shown as being in the process of requesting channel resources having a bandwidth requirement of 125 kbps in a frame time. Network node N5 608*e* has identified channel 2 as a primary channel. Network node N6 608*f* is shown as being in the process of requesting channel resources having a bandwidth requirement of 50 kbps in a frame time. Network node N6 608*f* has identified channel 4 as a primary channel, channel 1 as a secondary channel, and channel 9 as a tertiary channel. Network node N7 608*g* is shown as being in the process of requesting channel resources having a bandwidth requirement of 25 kbps in a frame time. Network node N7 608*g* has identified channel 6 as a primary channel, channel 3 as a secondary channel, and channel 8 as a tertiary channel. Network node N8 608*h* is shown as being in the process of requesting channel resources having a bandwidth requirement of 25 kbps in a frame time. Network node N8 608*h* has identified channel 6 as a primary channel, channel 3 as a secondary channel, and channel 8 as a tertiary channel. FIG. 6B shows using white slots the un-allocated slots available to network nodes N5-N8 608*e-h*.

FIG. 6C indicates using solid lines the connections from network nodes N5-N8 608*e-h* to corresponding radios R3, R5, R7, and R4 corresponding to the channels and slots allocated to network nodes N5-N8. The channel allocation schedule 610 in FIG. 6D indicates the channel resources allocated to network nodes N5-N8 as grey boxes with corresponding node number. The first 125 kbps slot in channel 2 is allocated to network node N5 608*e*. Network node N5 608*e* is indicated as having been allocated the primary (only) channel identified in its bandwidth requirements (in FIG. 6A). The second 50 kbps slot in channel 4 is allocated to network node N6 608*f*. Network node N6 608*f* is indicated as having been allocated the primary channel identified in the bandwidth requirements (in FIG. 6A). The second 25 kbps slot in channel 6 is allocated to network node N7 608*g*. Network node N7 608*g* is indicated as having been allocated the primary channel identified in the bandwidth requirements (in FIG. 6A). In allocating channel resources to network node N8 608*h*, the channel allocation schedule 610 may decide that the secondary channel indicated in the bandwidth requirement for network node N8 608*h* may be a better choice for network node N8 608*h* since the primary channel, channel 6, has less un-allocated bandwidth after one of the last two slots has been allocated to network node N7 608*g*. The second 25 kbps slot in channel 3 is allocated to network node N8 608*h*. Network node N8 608*h* is indicated as having been allocated the secondary channel identified in the bandwidth requirements.

FIG. 6E illustrates channel allocation in tertiary failover when network nodes experience an excessive number of data transmission errors. For example, referring to FIG. 6C, assuming network node N6 608*f* is communicating on its allocated second 50 kbps time slot in channel 4 with radio R5 and encounters a threshold number of communications errors. In an example implementation, the threshold number of communications errors may be based on a single type of error, such as an excessive number of collisions on a channel. The threshold number may be based on erroneous conditions, such as an internal timing error that may result in a loss in synchronicity between network nodes and the server, or on any other erroneous condition. The network node N6 608*f* may track erroneous conditions and failover to the secondary channel when a threshold number of erroneous conditions have been detected. The network node may fail over to the secondary channel by communicating data transmissions on the secondary channel. The server may then revise the channel allocation schedule 610 accordingly. In another example implementation, the network node N6 608*f* may send an error message to the server, either through a back channel, or another channel, for example, as an event-driven data transmission. The server may then handle the error message in a variety of ways. In one example, the server may re-allocate time slots in the secondary channel to the network node N6 608*f* and send a channel allocation message to the network node N6 608*f*. The network node N6 608*f* may then communicate data transmissions on the re-allocated slot(s) and secondary channel.

In the example illustrated in FIG. 6C, the network node N6 608*f* may be allocated the third 50 kbps slot in channel 1, which is indicated as the secondary channel in the bandwidth requirements for the network node N6 608*f*. If the network node N6 608*f* experiences further erroneous data transmissions on the secondary channel, the network node N6 608*f* may then failover in the same manner to its tertiary channel, channel 9. The network node N6 608*f* may also perform a tertiary failover if the secondary channel, for example, the third 50 kbps slot in channel 1, has been allocated an no longer available to the network node N6 608*f*.

Similarly, network node N8 608*h*, which was assigned its secondary channel, channel 3, may failover to its tertiary channel, channel 9. The channel allocation schedule 610 in FIG. 6E shows the network node N6 608*f* allocated the second 50 kbps slot in channel 9. Network node N8 608*h* is allocated the sixth slot in channel 8.

Figure 6F:
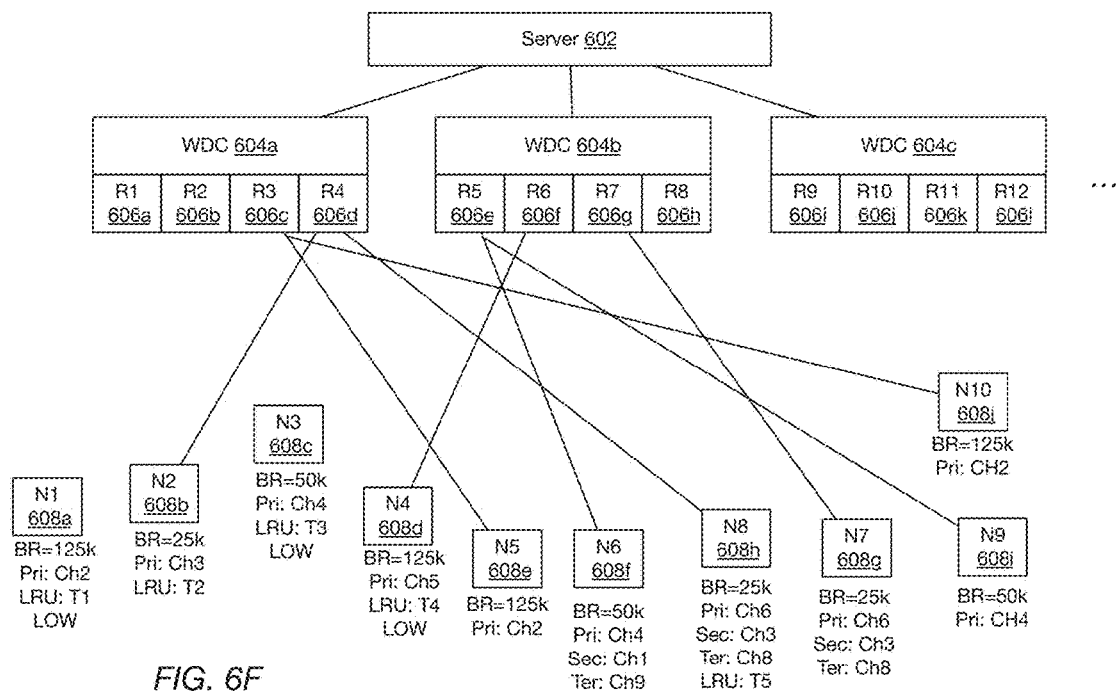
FIG. 6F is a schematic diagram of the wireless sensor network in FIG. 6A showing changes in allocation of channel resources to several illustrated network nodes due to virtual channel resources allocation.

FIGS. 6F-6G illustrate another method for allocating channel resources in a wireless sensor network. The method illustrated in FIGS. 6F and 6G may be implemented to provide virtual allocation of channel resources when a network node requests channel resources and the channel allocation schedule lacks sufficient un-allocated channel resources to fulfill the request. Referring back to FIG. 6E, the channel allocation schedule 610 has only two available slots, a 25 kbps in channel 3 and a 25 kbps slot in channel 6. The wireless sensor network 600 in FIG. 6C shows network node N9 608*i* and network node N10 608*j* requesting channel resources. Network node N9 608*i* has a bandwidth requirement of 50 kbps and network node N10 608*j* has a bandwidth requirement of 125 kbps. Network node N9 608*i* and network node N10 608*j* may each include a priority of HIGH, which may be communicated during the request for channel resources.

The server 602 determines that the channel allocation schedule 610 does not have sufficient channel resources to fulfill the request from either network node N9 nor network node N10. The server 602 may then identify a low priority network node based on an analysis of a communication record for each network node. The server 602 may use any one of a variety of conditions to identify the low priority node. In one example implementation, the server 602 may analyze the bandwidth requirements and available resources to identify a best criteria for identifying the low priority network node in the wireless sensor network. For example, network node N9 may determine it has bandwidth requirements indicating the network node N9 prioritizes high bandwidth availability in the short term. The network node N9 may need to communicate an indicated volume of data at a high priority in the next significant time frame, which may be defined by the application environment of the wireless sensor network. The network node N10 on the other hand may have bandwidth requirements indicating the network node N10 prioritizes availability in the long term. The network node N10 may need to communicate an indicated volume of data at a high priority over an extended timeframe, which may too be defined by the application environment of the wireless sensor network.

The server 602 may analyze the needs of each network node requesting network resources to determine a best criteria for identifying a low priority network node in a virtual time slot allocation method. For example, the server 602 may determine that high availability is needed in the short term. The server 602 may also determine that high availability over the long term is needed even the network node encounters a tolerable level of collisions. Based on the need of each network node, the server 602 may allocate resources to ensure a maximum throughput for each network node.

In an example implementation, the server 602 may compile a communication record for each network node. The server 602 may compare the communication record with the bandwidth requirement and other communication data relating to the network node to determine how to identify a low priority network node when the server 602 needs to allocate resources to a requesting network node and the channel allocation schedule has insufficient un-allocated time slots per channel to provide the requested resources. The server 602 may determine that a low priority network node has a one of a variety of criteria. FIGS. 6F and 6G illustrate two examples of the type of criteria that the server 602 may analyze to identify a low priority network node.

FIG. 6F illustrates an example of a low priority network node identify as the least recently used network node. For example, the server 602 may track and timestamp each time a network node transmits data on its allocated channel resources. The server 602 may maintain specific metrics to assess a priority for each network node at any given time. The server 602 may analyze a last used communication record in the communication record of each network node, particularly network nodes having allocated time slots and channels sufficient to meet the throughput required for the requesting network node's bandwidth requirement. The server 602 may then select the network node having the last used communication record with a least recently used time (i.e. Least Recently Used) to identify as the lowest priority network node.

FIG. 6F illustrates an example of using a Least Recently Used (LRU) channel resource to identify a low priority network node. Network nodes N1, N2, N3, and N4 are shown as having an example communication record indicated as an LRU time. The LRU times for the network nodes N1, N2, N3, and N4 are T1, T2, T3, and T4, respectively. The times are compared and the network node with the longest LRU time is deemed to have the lowest priority. In the example shown in FIG. 6F, network node N3 608c is found to have the longest LRU time T3. The server 602 may then de-allocate the allocated channel, channel 4, and the allocated time slot, the first 50 kbps slot in channel 4, of the identified low priority network node, network node N3 608c. The server 602 may also allocate the de-allocated channel, channel 4, and de-allocated time slot, the first 50 kbps slot in channel 4, to the network node N9 608i.

As shown in FIG. 6G, the server 602 may perform the same process to de-allocate the second 125 kbps time slot in channel 2 from network node N1 608a and allocate the second 125 kbps time slot in channel 2 to network node N10 608j. FIG. 6G shows the channel allocation schedule 610 with the channel and time slots allocated to network nodes N9 and N10.

In other example implementations, the server 602 may identify the lowest priority network node using other methods. For example, the server 602 may maintain and analyze a frequency of use communication record in the communication record of each network node having allocated channel resources sufficient to meet the bandwidth requirement of the requesting network node. The server 602 may then select the network node having the frequency of use communication record with a lowest frequency of use and identify that network node as being the lowest priority network node.

It is noted that the Least Recently Used and the Least Frequently Used determinations are described as examples for determining the lowest priority network node in a wireless sensor network. The description of the Least Recently Used and the Least Frequently Used determinations is not intended to be limiting in any way. Other methods may be used as well.

Figure 7A:
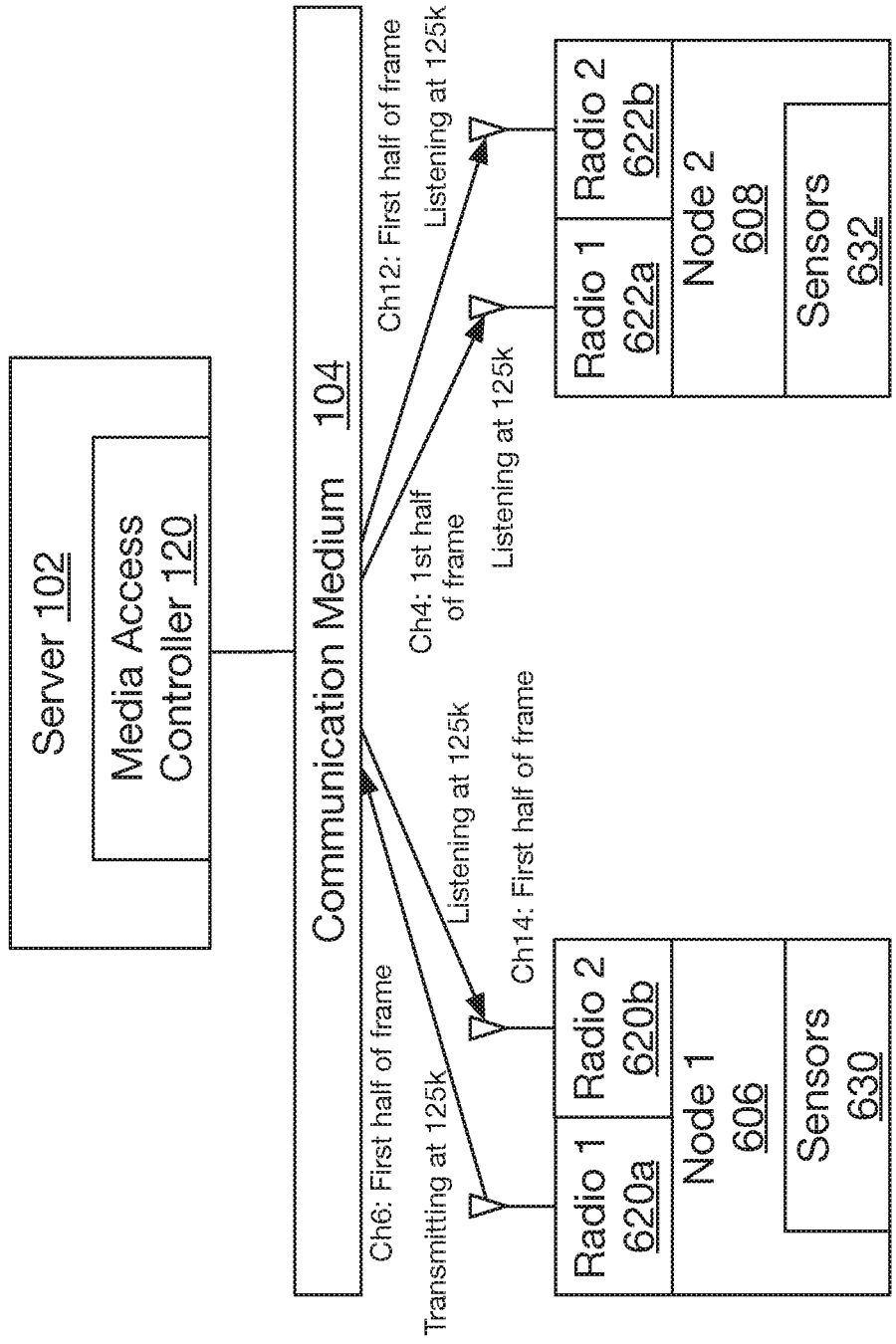
FIG. 7A is a schematic diagram illustrating the data communication from two networked nodes having multiple radios in two different modes in the first half of a frame.
Figure 7B:
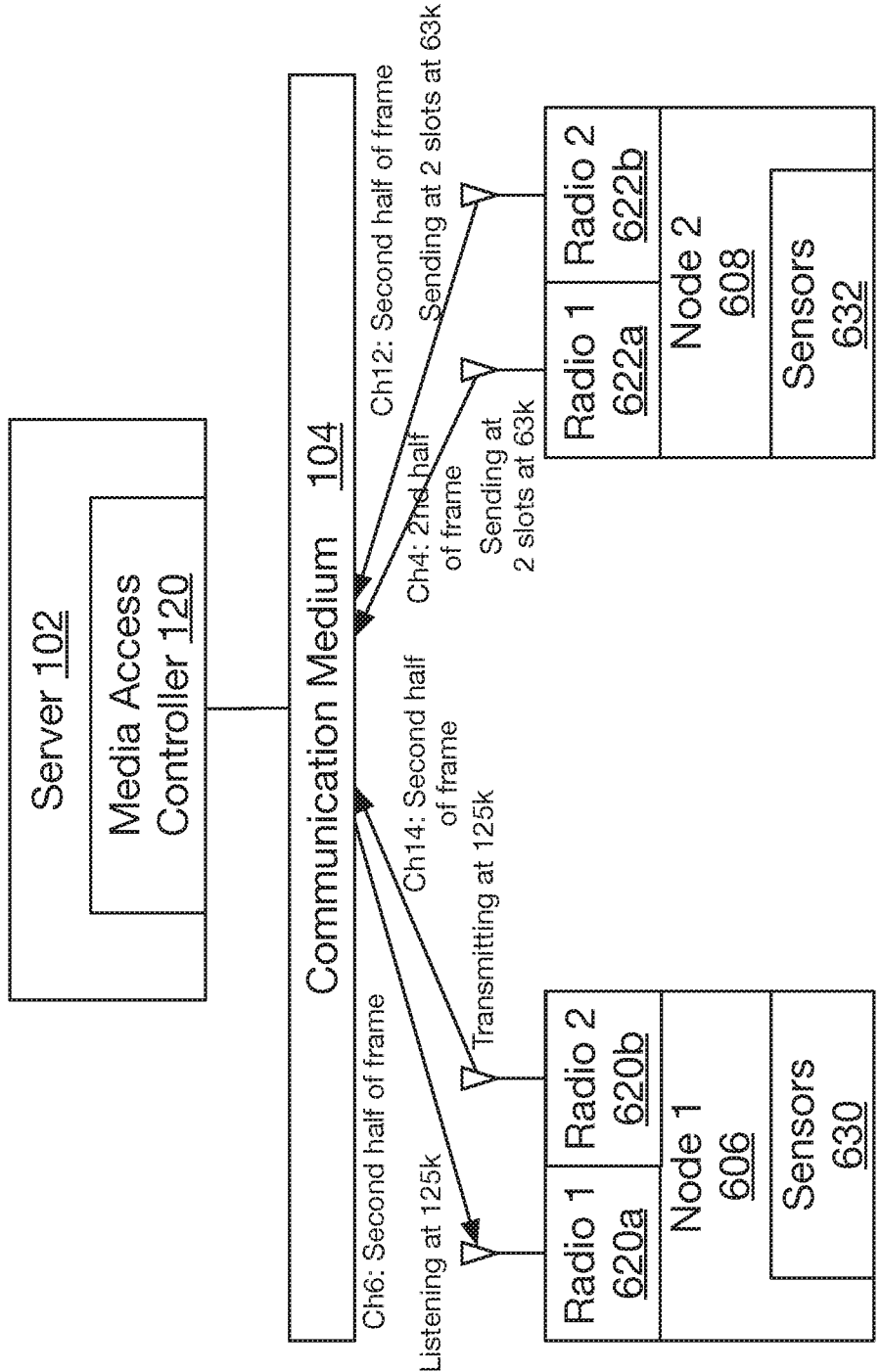
FIG. 7B is a schematic diagram of the example illustrated in FIG. 6A in a second half of the frame.

As noted above, the channel allocation schedule (250 in FIG. 2B or 500 in FIG. 5A) may provide redundancy in the communication from the network nodes 106 (FIG. 1). Several mechanisms may be employed for redundant communications using the channel allocation schedule. FIGS. 7A and 7B illustrate examples of two mechanisms by which redundancy may be implemented using the channel allocation schedule. FIG. 7A is a schematic diagram illustrating the data communication from two networked nodes having multiple radios in two different modes in the first half of a frame. FIG. 7B is a schematic diagram of the example illustrated in FIG. 7A in a second half of the frame. The examples described with reference to FIGS. 7A and 7B refer to the channel allocation schedule 250 in FIG. 2B.

As shown in FIGS. 7A and 7B, Node 1 606 employs a first radio 620a and a second radio 620b to communicate data from sensors 630. Node 2 608 employs a first radio 622a and a second radio 622b to communicate data from sensors 632. FIG. 7A shows communication by Node 1 606 and Node 2 608 in the first half of a frame, where the frame is defined to be one second as shown in the channel allocation schedule 250 in FIG. 2B. The first radio 620a on Node 1 606 is allocated the two 125 kbps time slots of channel 6, and the second radio 620b of Node 1 606 is allocated the two 125 kbps time slots of channel 14. The first radio 622a of Node 2 608 is allocated the 125 kbps time slot in the first frame half and the two 63 kbps time slots in the second frame half of channel 4. The second radio 622b of Node 2 608 is allocated the 125 kbps time slot in the first frame half and the two 63 kbps time slots in the second frame half of channel 12.

Referring to FIG. 7A, Node 1 606 illustrates the first mode of redundancy in which the first radio 620a transmits at 125 kbps on channel 6 while the second radio 620b listens at 125 kbps on channel 14 during the first half of the frame. Referring now to FIG. 7B, the first radio 620a of Node 1 606 listens at 125 kbps on channel 6 while the second radio 620b of Node 1 606 transmits at 125 kbps on channel 14 in the second half of the frame. In the first mode of redundancy, the two radios perform the opposite functions of transmitting and listening in the alternating half frames in each channel.

Referring back to FIG. 7A, Node 2 608 illustrates the second mode of redundancy in which both the first radio 622a on channel 4 and the second radio 622b on channel 12 listen at 125 kbps the first half of the frame. Referring now to FIG. 7B, both the first radio 622a on channel 4 and the second radio 622b on channel 12 transmit in two time slots at 63 kbps each. In the second mode of redundancy, the two radios perform the same functions of transmitting and listening in the alternating half frames in each channel.

The above-described examples of implementations further include the following example implementations indicating manners in which variations of embodiments of the invention may arise. In one aspect, a method is provided where the channel on which the request was received is a first channel. The method further comprises receiving an error message from the network node, the error message indicative of a failed communication condition. A second channel and at least one time slot in the frame of the second channel are identified where the at least one time slot provides a throughput corresponding to the bandwidth requirement. The channel resource allocation message is sent to the network node identifying the at least one time slot in the frame of the second channel as allocated to the network node.

This method may further comprise receiving an error message from the network node, the error message indicative of a failed communication condition from communicating on the second channel. The method may further comprise identifying a third channel and at least one time slot in the frame of the third channel. The at least one time slot provides a throughput corresponding to the bandwidth requirement. The channel resource allocation message is sent to the network node identifying the at least one time slot in the frame of the second channel as allocated to the network node.

In another aspect, the method may further comprise, where the plurality of network nodes communicate with at least one server-side radio on each of the plurality of channels:
  receiving an error message from the network node, the error message reporting an erroneous condition in data transmission on the selected channel;
  incrementing a channel error count for the selected channel; and
  restarting each of the at least one radio communicating on the selected channel when the channel error count exceeds a channel error threshold.

This method may further comprise receiving a second request for channel resources from the network node.

This method may also further comprise incrementing a channel restart count when the step of restarting the at least one radio communicating on the selected channel is performed; and shutting down the at least one radio communicating on the selected channel when the channel restart count is equal to or greater than a channel restart threshold.

This method may also further comprise:
  a. determining that the channel allocation schedule does not include a number of un-allocated time slots on any channel to provide sufficient throughput to meet the bandwidth requirement for the network node;
  b. determining a re-allocation technique for identifying a low priority network node to de-allocate;
  c. identifying a low priority network node using the re-allocation technique;
  d. de-allocating an allocated channel and at least one allocated time slot for the identified low priority network node; and
  e. allocating the de-allocated channel and at least one de-allocated time slot to the network node.

The method of determining the re-allocation technique may further comprise:
  1. comparing the bandwidth requirements of the network node with the communication records of the network nodes having allocated time slots; and
  2. selecting a re-allocation technique based on the comparison.

This method may further require where the step of identifying the low priority network node comprises identifying the low priority network node based on determining a least recently used allocated time slot according to a least recently used re-allocation technique; analyzing a last used communication record in the communication record of each network node having the allocated channel and at least one allocated time slot; and selecting the network node having the last used communication record with a longest last recently used time to identify as the lowest priority network node.

This method may further require where the step of identifying the low priority network node comprises identifying the low priority network node based on determining a least frequently used allocated time slot according to a least frequently used re-allocation technique; analyzing a frequency of use communication record in the communication record of each network node having the allocated channel and at least one allocated time slot; and selecting the network node having the frequency of use communication record with a lowest frequency of use to identify as the lowest priority network node.

In another aspect, the server may include where the channel on which the request was received is a first channel, and where the non-transitory computer-readable medium stores executable instructions that, when executed by the processor, are operative to:
  a. receive an error message from the network node, the error message indicative of a failed communication condition;
  b. identify a second channel and at least one time slot in the frame of the second channel, the at least one time slot providing a throughput corresponding to the bandwidth requirement;
  c. send the channel resource allocation message to the network node identifying the at least one time slot in the frame of the second channel as allocated to the network node.

The server may further include where the channel on which the request was received is a first channel, and where the non-transitory computer-readable medium stores executable instructions that, when executed by the processor, are operative to:
  a. receive an error message from the network node, the error message indicative of a failed communication condition and comprising a second bandwidth requirement;
  b. identify a third channel and at least one time slot in the frame of the third channel, the at least one time slot providing a throughput corresponding to the bandwidth requirement;

c. send the channel resource allocation message to the network node identifying the at least one time slot in the frame of the second channel as allocated to the network node.

The server may further include where:

a. network interface comprises at least one radio to communicate on each of the plurality of channels; and where the non-transitory computer-readable medium stores executable instructions that, when executed by the processor, are operative to:

b. receive an error message from the network node, the error message reporting an erroneous condition in data transmission on the selected channel;

c. increment a channel error count for the selected channel;

d. disable each of the at least one radio communicating on the selected channel when the channel error count exceeds a channel error threshold; and e. restart each of the at least one radio communicating on the selected channel.

The server may further include where the non-transitory computer-readable medium stores executable instructions that, when executed by the processor, are operative to receive a second request for channel resources from the network node.

The server may further include where the non-transitory computer-readable medium stores executable instructions that, when executed by the processor, are operative to:

1. increment a channel restart count when the steps of disabling and restarting the at least one radio communicating on the selected channel; and 2. shut down the at least radio communicating on the selected channel when the channel restart count is equal to or greater than a channel restart threshold.

The server may further include where the non-transitory computer-readable medium stores executable instructions that, when executed by the processor, are operative to:

1. determine that the channel allocation schedule does not include a number of un-allocated time slots on any channel to provide sufficient throughput to meet the bandwidth requirement for the network node;

2. identify a low priority network node based on an analysis of a communication record for each network node;

3. de-allocate an allocated channel and at least one allocated time slot for the identified low priority network node; and 4. allocate the de-allocated channel and at least one de-allocated time slot to the network node.

The server may further include where the non-transitory computer-readable medium stores executable instructions that, when executed by the processor, are operative to:

a. in the step of identifying the low priority network node:
  i. analyze a last used communication record in the communication record of each network node having the allocated channel and at least one allocated time slot;
  ii. select the network node having the last used communication record with a longest last recently used time to identify as the lowest priority network node.

The server may further include where the non-transitory computer-readable medium stores executable instructions that, when executed by the processor, are operative to:

a. in the step of identifying the low priority network node:
  i. analyze a frequency of use communication record in the communication record of each network node having the allocated channel and at least one allocated time slot; and
  ii. select the network node having the frequency of use communication record with a lowest frequency of use to identify as the lowest priority network node.

In another aspect, the method performed by the network node may further comprise:

a. where the step of detecting the error condition comprises:
  where the step of monitoring the selected channel comprises:
    sensing the communication medium at the allocated time slot for a collision condition with another data transmission; and
  the step of detecting the error condition comprises:
    identifying the collision condition as the error condition.

This method may further comprise:
the step of sending the channel request message includes configuring the channel request message to include a redundancy request;
where in the step of receiving the channel allocation message from the server, the channel allocation message comprises a first channel identifier identifying a first allocated channel, at least one first channel time slot, a second channel identifier identifying a second allocated channel, and at least one second channel time slot.

This method may further comprise where the step of sending the stored data further comprises simultaneously sending the stored data on the communication medium over the first allocated channel and the second allocated channel at the corresponding allocated time slots.

This method may further comprise where the step of sending the channel request message comprises generating the bandwidth requirement to include a data volume and a communication periodic rate.

This method may further comprise receiving an event signal corresponding to a substantially random event, generating an event message comprising data corresponding to the event signal; and sending an event-driven transmission including the event message on the selected channel.

This method may further comprise, where the step of sending the event-driven transmission comprises sensing a gap time in the frame of the selected channel; and sending the event-driven transmission during the gap time.

It will be understood that various aspects or details of the invention may be changed without departing from the scope of the invention. The above description is not exhaustive and does not limit the claimed inventions to the precise form disclosed. Furthermore, the above description is for the purpose of illustration only, and not for the purpose of limitation. Modifications and variations are possible in light of the above description or may be acquired from practicing the invention. The claims and their equivalents define the scope of the invention.

What is claimed is:

1. A method comprising:
generating, at a server, a channel allocation schedule, wherein the channel allocation schedule identifies a plurality of channels and a plurality of network nodes, each channel corresponding to a particular frequency, wherein the channel allocation schedule identifies a first plurality of time slots for a first channel of the plurality of channels during a first time period, wherein the channel allocation schedule identifies a second plurality of time slots for a second channel of the plurality of channels during a second time period, wherein the channel allocation schedule identifies a third plurality of time slots for a third channel of the plurality of channels during the second time period, wherein the first plurality of time slots has a different number of time slots than the second plurality of time slots and a different number of time slots than the third plurality of time slots, wherein each time slot of the first plurality of time slots is associated with a first bandwidth capacity, wherein each time slot of the second plurality of time slots is associated with a second bandwidth capacity, and wherein each time slot of the third plurality of time slots is associated with a third bandwidth capacity;

receiving, at the server, a request for channel resources from a network node of the plurality of network nodes, wherein the request identifies a particular bandwidth amount;

updating the channel allocation schedule to allocate the request to a particular time slot of the first plurality of time slots, wherein the particular time slot is selected based on the particular bandwidth amount and the first bandwidth capacity, and wherein the first bandwidth capacity is sufficient for the particular bandwidth amount;

sending, from the server, a channel resource allocation message identifying the particular time slot; and responsive to the server detecting erroneous conditions corresponding to the particular time slot, updating the channel allocation schedule to allocate the request to a second particular time slot of the third plurality of time slots, wherein the second particular time slot is selected based on the particular bandwidth amount, the second bandwidth capacity, and the third bandwidth capacity, wherein the second bandwidth capacity is insufficient for the particular bandwidth amount, and wherein the third bandwidth capacity is sufficient for the particular bandwidth amount.

2. The method of claim 1 further comprising, before detecting the erroneous conditions:

identifying a communication periodic rate based on the request; and updating the channel allocation schedule to allocate the request to a third particular time slot of a third time period distinct from the first time period and distinct from the second time period, wherein the third particular time slot is associated with the first bandwidth capacity, wherein a particular period of time between the particular time slot and the third particular time slot is sufficient to satisfy the communication periodic rate.

3. The method of claim 1, wherein the first time period corresponds to a first subframe of the first channel and a second subframe of the second channel, the first subframe comprising the first plurality of time slots and the second subframe comprising the second plurality of time slots.

4. The method of claim 1, wherein the channel allocation schedule identifies a first transmitter associated with the first channel and a second transmitter associated with the second channel, and wherein the channel allocation schedule indicates that the first transmitter and the second transmitter transmit concurrently.

5. The method of claim 1, wherein the request identifies a subset of the plurality of channels, and wherein the particular time slot is selected based on the subset of the plurality of channels.

6. The method of claim 1, wherein the erroneous conditions are detected responsive to the server receiving an error message indicating that an error occurred during transmission during the particular time slot.

7. The method of claim 1, wherein the channel allocation schedule associates a first time slot of the first plurality of time slots with a second network node of the plurality of network nodes, wherein the channel allocation schedule associates a second time slot of the first plurality of time slots with a third network node of the plurality of network nodes, the second network node distinct from the second network node.

8. An apparatus comprising:

a network interface configured to initiate exchange of data with a plurality of network nodes via a plurality of channels, each channel corresponding to a particular frequency;

a media access controller configured to:

generate a channel allocation schedule, wherein the channel allocation schedule identifies the plurality of channels and a plurality of network nodes, wherein the channel allocation schedule identifies a first plurality of time slots for a first channel of the plurality of channels during a first time period, wherein the channel allocation schedule identifies a second plurality of time slots for a second channel of the plurality of channels during a second time period, wherein the channel allocation schedule identifies a third plurality of time slots for a third channel of the plurality of channels during the second time period, wherein the first plurality of time slots has a different number of time slots than the second plurality of time slots and a different number of time slots than the third plurality of time slots, wherein each time slot of the first plurality of time slots is associated with a first bandwidth capacity, wherein each time slot of the second plurality of time slots is associated with a second bandwidth capacity, and wherein each time slot of the third plurality of time slots is associated with a third bandwidth capacity;

receive a request for channel resources from a network node of the plurality of network nodes, wherein the request identifies a particular bandwidth amount;

updating the channel allocation schedule to allocate the request to a particular time slot of the first plurality of time slots, wherein the particular time slot is selected based on the particular bandwidth amount and the first bandwidth capacity, and wherein the first bandwidth capacity is sufficient for the particular bandwidth amount;

send a channel resource allocation message to the network node identifying the particular time slot; and responsive to detecting erroneous conditions corresponding to the particular time slot, update the channel allocation schedule to allocate the request to a second particular time slot of the third plurality of time slots, wherein the second particular time slot is selected based on the particular bandwidth amount, the second bandwidth capacity, and the third bandwidth capacity, wherein the second bandwidth capacity is insufficient for the particular bandwidth amount, and wherein the third bandwidth capacity is sufficient for the particular bandwidth amount.

9. The apparatus of claim 8, wherein the media access controller is further configured to, before detecting the erroneous conditions:

identify a communication periodic rate based on the request; and update the channel allocation schedule to allocate the request to a third particular time slot of a third time period distinct from the first time period and distinct from the second time period, wherein the third particular time slot is associated with the first bandwidth capacity, wherein a particular period of time between the particular time slot and the third particular time slot is sufficient to satisfy the communication periodic rate.

10. The apparatus of claim 8, wherein the first time period corresponds to a first subframe of the first channel and a second subframe of the second channel, the first subframe comprising the first plurality of time slots and the second subframe comprising the second plurality of time slots.

11. The apparatus of claim 8, wherein the channel allocation schedule identifies a first transmitter associated with the first channel and a second transmitter associated with the second channel, and wherein the channel allocation schedule indicates that the first transmitter and the second transmitter transmit concurrently.

12. The apparatus of claim 11, wherein the request identifies a subset of the plurality of channels, and wherein the particular time slot is selected based on the subset of the plurality of channels.

13. The apparatus of claim 8, wherein the media access controller is further configured to detect the erroneous conditions responsive to receiving an error message indicating that an error occurred during transmission during the particular time slot.

14. The apparatus of claim 8, wherein the channel allocation schedule associates a first time slot of the first plurality of time slots with a second network node of the plurality of network nodes, wherein the channel allocation schedule associates a second time slot of the first plurality of time slots with a third network node of the plurality of network nodes, the second network node distinct from the third network node.

15. A non-transitory computer-readable storage device storing instructions that are executable by a processor to cause the processor to perform operations comprising:

generating a channel allocation schedule, wherein the channel allocation schedule identifies a plurality of channels and a plurality of network nodes, each channel corresponding to a particular frequency, wherein the channel allocation schedule identifies a first plurality of time slots for a first channel of the plurality of channels during a first time period, wherein the channel allocation schedule identifies a second plurality of time slots for a second channel of the plurality of channels during a second time period, wherein the channel allocation schedule identifies a third plurality of time slots for a third channel of the plurality of channels during the second time period, wherein the first plurality of time slots has a different number of time slots than the second plurality of time slots and a different number of time slots than the third plurality of time slots, wherein each time slot of the first plurality of time slots is associated with a first bandwidth capacity, wherein each time slot of the second plurality of time slots is associated with a second bandwidth capacity, and wherein each time slot of the third plurality of time slots is associated with a third bandwidth capacity;

receiving a request for channel resources from a network node of the plurality of network nodes, wherein the request identifies a particular bandwidth amount;

updating the channel allocation schedule to allocate the request to a particular time slot of the first plurality of time slots, wherein the particular time slot is selected based on the particular bandwidth amount and the first bandwidth capacity, and wherein the first bandwidth capacity is sufficient for the particular bandwidth amount;

initiating transmission of a channel resource allocation message identifying the particular time slot; and responsive to detecting erroneous conditions corresponding to the particular time slot, updating the channel allocation schedule to allocate the request to a second particular time slot of the third plurality of time slots, wherein the second particular time slot is selected based on the particular bandwidth amount, the second bandwidth capacity, and the third bandwidth capacity, wherein the second bandwidth capacity is insufficient for the particular bandwidth amount, and wherein the third bandwidth capacity is sufficient for the particular bandwidth amount.

16. The non-transitory computer-readable storage device of claim 15, wherein the operations further comprise, before detecting the erroneous conditions:

identifying a communication periodic rate based on the request; and updating the channel allocation schedule to allocate the request to a third particular time slot of a third time period distinct from the first time period and distinct from the second time period, wherein the third particular time slot is associated with the first bandwidth capacity, wherein a particular period of time between the particular time slot and the third particular time slot is sufficient to satisfy the communication periodic rate.

17. The non-transitory computer-readable storage device of claim 15, wherein the first time period corresponds to a first subframe of the first channel and a second subframe of the second channel, the first subframe comprising the first plurality of time slots and the second subframe comprising the second plurality of time slots.

18. The non-transitory computer-readable storage device of claim 15, wherein the channel allocation schedule identifies a first transmitter associated with the first channel and a second transmitter associated with the second channel, and wherein the channel allocation schedule indicates that the first transmitter and the second transmitter transmit concurrently.

19. The non-transitory computer-readable storage device of claim 15, wherein the request identifies a subset of the plurality of channels, and wherein the particular time slot is selected based on the subset of the plurality of channels.

20. The non-transitory computer-readable storage device of claim 15, wherein the channel allocation schedule associates a first time slot of the first plurality of time slots with a second network node of the plurality of network nodes, wherein the channel allocation schedule associates a second time slot of the first plurality of time slots with a third network node of the plurality of network nodes, the second network node distinct from the third network node.

* * * * *